United States Patent
Sahin et al.

(10) Patent No.: US 9,930,558 B2
(45) Date of Patent: Mar. 27, 2018

(54) HIGH FREQUENCY RADIO ENVIRONMENTAL MAPPING AND SYSTEM PROCEDURES

(71) Applicant: IDAC Holdings, Inc., Wilmington, DE (US)

(72) Inventors: Onur Sahin, London (GB); Ravikumar V. Pragada, Collegeville, PA (US); Philip J. Pietraski, Jericho, NY (US); Douglas R. Castor, Norristown, PA (US); Alan G. Carlton, Mineola, NY (US); Dirk Trossen, London (GB)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/110,659

(22) PCT Filed: Jan. 13, 2015

(86) PCT No.: PCT/US2015/011113
§ 371 (c)(1),
(2) Date: Jul. 8, 2016

(87) PCT Pub. No.: WO2015/106237
PCT Pub. Date: Jul. 16, 2015

(65) Prior Publication Data
US 2016/0330643 A1 Nov. 10, 2016

Related U.S. Application Data

(60) Provisional application No. 61/926,766, filed on Jan. 13, 2014, provisional application No. 62/082,465, filed on Nov. 20, 2014.

(51) Int. Cl.
*H04W 24/10* (2009.01)
*H04W 16/14* (2009.01)
*H04W 16/28* (2009.01)
*H04L 5/00* (2006.01)
*H04W 72/04* (2009.01)

(52) U.S. Cl.
CPC .......... *H04W 24/10* (2013.01); *H04L 5/0048* (2013.01); *H04W 16/14* (2013.01); *H04W 16/28* (2013.01); *H04W 72/0446* (2013.01)

(58) Field of Classification Search
CPC . H04W 24/10; H04W 72/0446; H04W 16/14; H04W 16/28; H04L 5/0048
See application file for complete search history.

(56) References Cited

U.S. PATENT DOCUMENTS

| | | | |
|---|---|---|---|
| 2008/0108352 A1* | 5/2008 | Montemurro | H04L 43/0847 455/437 |
| 2012/0046066 A1* | 2/2012 | Tamura | H04L 1/0029 455/525 |
| 2014/0128109 A1* | 5/2014 | Li | H04W 68/02 455/458 |

FOREIGN PATENT DOCUMENTS

| | | |
|---|---|---|
| EP | 2693792 A1 | 2/2014 |
| WO | WO 2013/127355 A1 | 9/2013 |

(Continued)

OTHER PUBLICATIONS

3rd Generation Partnership Project (3GPP), TR 36.932 V12.1.0, "Technical Specification Group Radio Access Network, Scenarios and Requirements for Small Cell Enhancements for E-UTRA and E-UTRAN (Release 12)", Mar. 2013, 14 pages.

(Continued)

*Primary Examiner* — Thai Nguyen
(74) *Attorney, Agent, or Firm* — Condo Roccia Koptiw LLP

(57) ABSTRACT

Systems, methods, and instrumentalities are provided to implement a method for radio environment, measurement (REM) scheduling, information extraction, storage and processing to generate terrain and object mapping/identification using higher frequency radio signals, directional transmission techniques and external database information.

(Continued)

Described are wireless transmit/receive units (WTRUs) comprising a processor configured to, when the WTRU is in an idle state, receive a common control channel from a millimeter wave base station (mB), decode a measurement schedule included in the common control channel, wherein the measurement schedule includes one or more slots during which sounding signals will be sent, and, determine a slot during which the WTRU is available to measure a sounding signal, and, when the WTRU is in a connected state, receive a dedicated control channel from a millimeter wave base station (mB), decode a measurement schedule and a receiver configuration included in the dedicated control channel, wherein the measurement schedule and the receiver configuration are specific to the WTRU, and wherein the measurement schedule includes one or more slots during which sounding signals will be sent, and determine a slot during which the WTRU is available to measure a sounding signal.

16 Claims, 19 Drawing Sheets

(56) References Cited

FOREIGN PATENT DOCUMENTS

| WO | WO 2014/036150 A1 | 3/2014 |
|---|---|---|
| WO | WO 2014/144079 A2 | 9/2014 |

OTHER PUBLICATIONS

3rd Generation Partnership Project (3GPP), TS 36.214 V11.1.0, "Technical Specification Group Radio Access Network, Evolved Universal Terrestrial Radio Access (E-UTRA), Physical Layer, Measurements (Release 11)", Dec. 2012, 14 pages.

3rd Generation Partnership Project (3GPP), TS 37.320 V11.3.0, "Technical Specification Group Radio Access Network, Universal Terrestrial Radio Access (UTRA) and Evolved Universal Terrestrial Radio Access (E-UTRA), Radio Measurement Collection for Minimization of Drive Tests (MDT), Overall Description, Stage 2 (Release 11)", Mar. 2013, 23 pages.

Boccardi et al., "Five Disruptive Technology Directions for 5G", 5G Wireless Communication Systems: Prospects and Challenges, IEEE Communications Magazine, Feb. 2014, pp. 74-80.

Popovski et al., "Requirement Analysis and Design Approaches for 5G Air Interface", Deliverable D2.1, Document No. ICT-317669-METIS/D2.1, Project Name: Mobile and Wireless Communications Enablers for the Twenty-Twenty Information Society (METIS), Aug. 30, 2013, 72 pages.

Rappaport et al.,"Millimeter Wave Mobile Communications for 5G Cellular: It Will Work!", IEEE Access Journal, vol. 1, No. 1, May 10, 2013, pp. 335-349.

Zhao, Youping, "Enabling Cognitive Radios through Radio Environment Maps", Blacksburg, Virginia, May 8, 2007, 188 pages.

* cited by examiner mB = Millimeter Wave Basestation
mBA = mB Aggregator

HIGH FREQUENCY RADIO ENVIRONMENTAL MAPPING AND SYSTEM PROCEDURES

CROSS REFERENCE TO RELATED APPLICATIONS

This application is the National Stage Entry under 35 U.S.C. § 371 of Patent Cooperation Treaty Application No. PCT/US2015/011113, filed Jan. 13, 2015, which claims the benefit of U.S. provisional application 61/926,766, filed on Jan. 13, 2014; and the benefit of U.S. provisional application 62/082,465, filed on Nov. 20, 2014; the contents of which are hereby incorporated by reference herein.

BACKGROUND

A predicable demand for data, and corresponding increase in data delivery capacity, has been observed for at least the last 50 years and has come to be known as Cooper's Law. Cooper's Law states that the total capacity will double about every 30 months. More recently, this has been closer to doubling every year or two. There are many incremental technology advances taking place in air interfaces and in networks that are expected to provide meaningful gains, but for the predicted demand for mobile data a decade from now, only two main synergetic strategies emerge as the technologies capable of delivering this huge demand.

One such strategy is the use of smaller and smaller cells. "Small cells" implies an increased spatial reuse of the same spectrum and has been a conceptually simple way to achieve greater capacity over the last few decades. Using low-power nodes may be one of the ways to cope with mobile traffic explosion, especially for hotspot deployments in indoor and outdoor scenarios. A low-power node generally means a node whose Tx power is lower than macro node and BS classes, for example Pico and Femto eNB may be both applicable.

Another strategy is the use of additional spectrum, for example 3.5 GHz and higher frequencies. There is potential for large bandwidth channels to be available in high frequency carriers. A synergetic effect may be exploited at higher frequencies that is not possible in lower-frequencies (for example, below 2 GHz), as there may be the potential of much greater spatial reuse.

In order to close the link budget for millimeter wave (mmW) communications, highly directional antennas may be needed. Highly directional antennas may make the transmissions highly contained, as transmitted energy is concentrated on the intended receiver (e.g., increasing signal strength), while radiating little in other directions (e.g., reducing the likelihood that the transmission will cause much interference for unintended receivers). This may help address inter-cell interference in small cells. Since there may be a low probability of interference in the first place, there may be less of a requirement for complicated inter-cell interference mitigations techniques. In the mmW spectrum, there may be potentially large amounts of spectrum that could be made available (e.g., 60 GHz unlicensed spectrum alone may be about 7 GHz (e.g., depending on country). There may be potentially more that could become available either as licensed, lightly licensed, or unlicensed spectrum.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and instrumentalities are provided that may be related to radio environment measurement (REM) scheduling, information extraction, storage, and processing for various applications including terrain and object mapping/identification, e.g., using higher frequency radio signals, directional transmission techniques and external database information. An exemplary transmit/receive unit (WTRU) may comprise a processor. The processor may be configured to, when the WTRU is in an idle state, receive a common control channel from a millimeter wave base station (mB), decode a measurement schedule included in the common control channel, wherein the measurement schedule identifies one or more slots during which sounding signals will be sent, and, determine a slot during which the WTRU is available to measure a sounding signal. The processor may be configured to, when the WTRU is in a connected state, receive a dedicated channel (e.g., a dedicated control channel or dedicated data channel) from a millimeter wave base station (mB), decode a measurement schedule and a receiver configuration included in the dedicated control channel, wherein the measurement schedule and the receiver configuration may be specific to the WTRU, and wherein the measurement schedule may identify one or more slots during which sounding signals will be sent, and determine, based on the measurement schedule included in the dedicated channel, a slot during which the WTRU is available to measure a sounding signal.

The processor may be configured to, when the WTRU is in the connected state, receive the common control channel from the millimeter wave base station (mB), decode the measurement schedule included in the common control channel, and determine, based on the measurement schedule included in the common control channel, a slot during which the WTRU is available to measure a sounding signal.

DETAILED DESCRIPTION

Figure 1A:
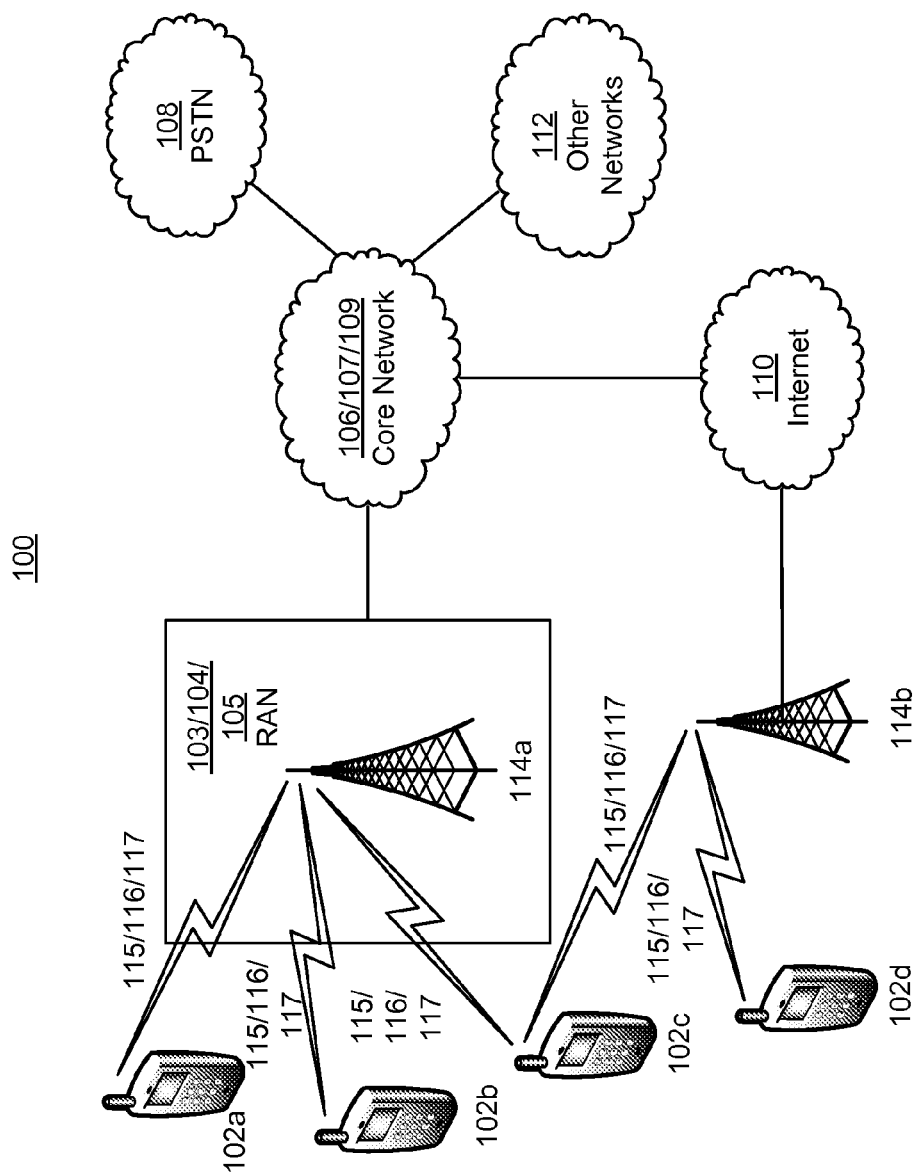
FIG. 1A is a system diagram of an example communications system in which one or more disclosed embodiments may be implemented.

Although this description provides a detailed example of possible implementations, it should be noted that the details are intended to be exemplary and in no way limit the scope of the application. FIG. 1A is a diagram of an example communications system 100 in which one or more disclosed embodiments may be implemented. The communications system 100 may be a multiple access system that provides content, such as voice, data, video, messaging, broadcast, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. A WTRU and user equipment (UE) may be interchangeably used herein. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light). The air interface 115/116/117 may be established using any suitable radio access technology (RAT).

More specifically, as noted herein, the communications system 100 may be a multiple access system and may employ one or more channel access schemes, such as CDMA. TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
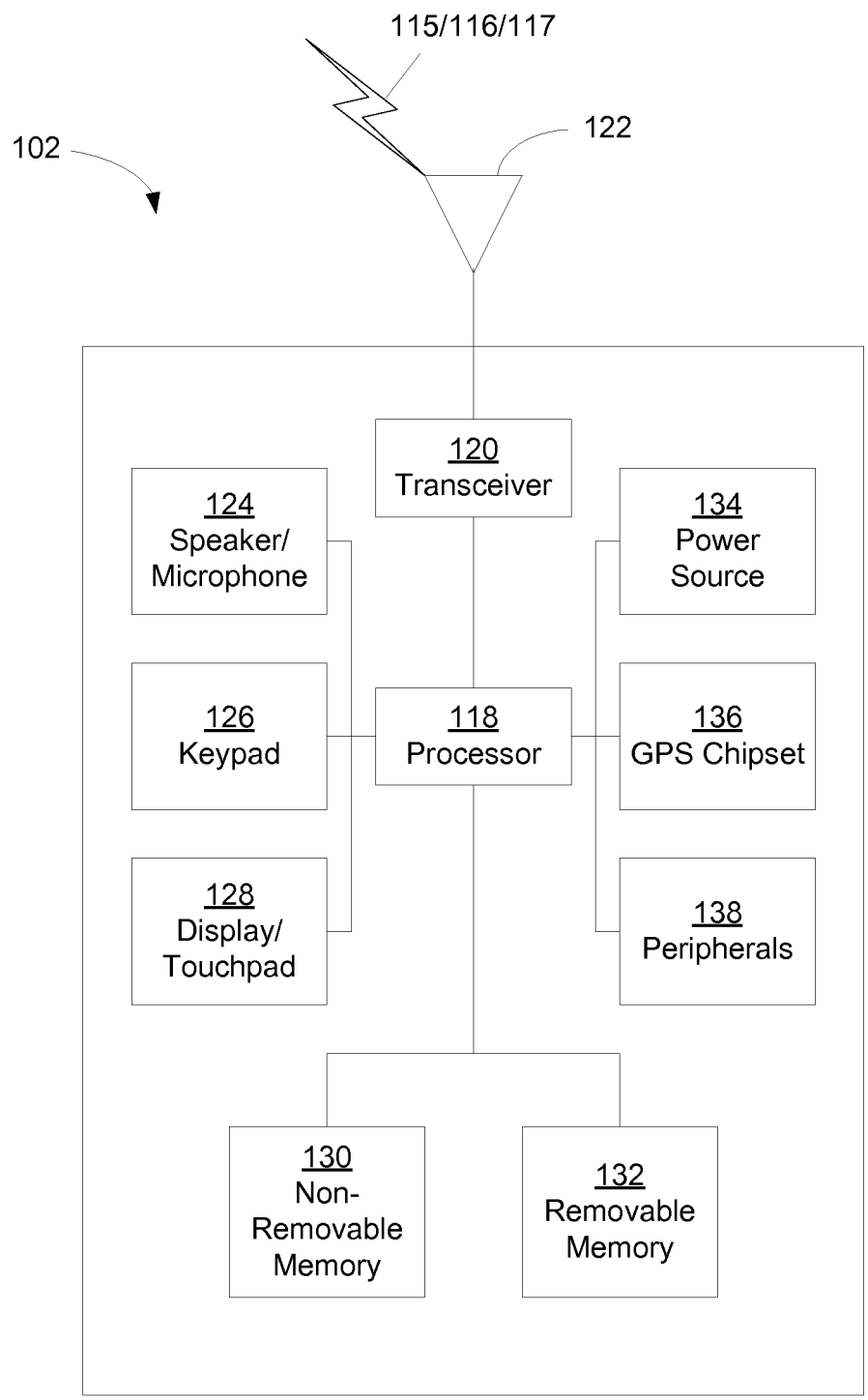
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted herein, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion)), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
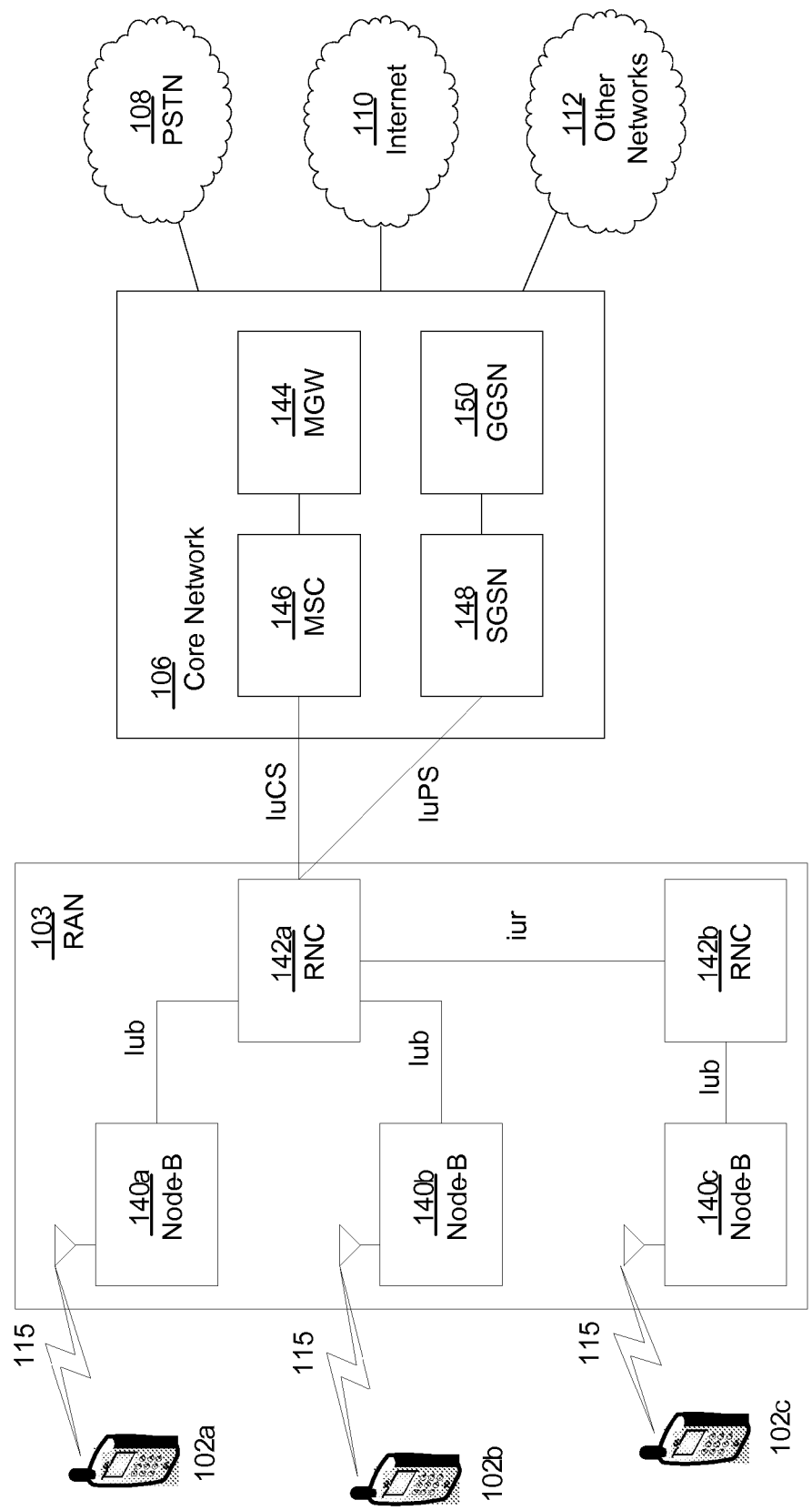
FIG. 1C is a system diagram of an example radio access network and an example core network that may be used within the communications system illustrated in FIG. 1A.

FIG. 1C is a system diagram of the RAN 103 and the core network 106 according to an embodiment. As noted herein, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b. 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b. 102c and IP-enabled devices.

As noted herein, the core network 106 may also be connected to the networks 112, which may include other wired or wireless networks that are owned and/or operated by other service providers.

Figure 1D:
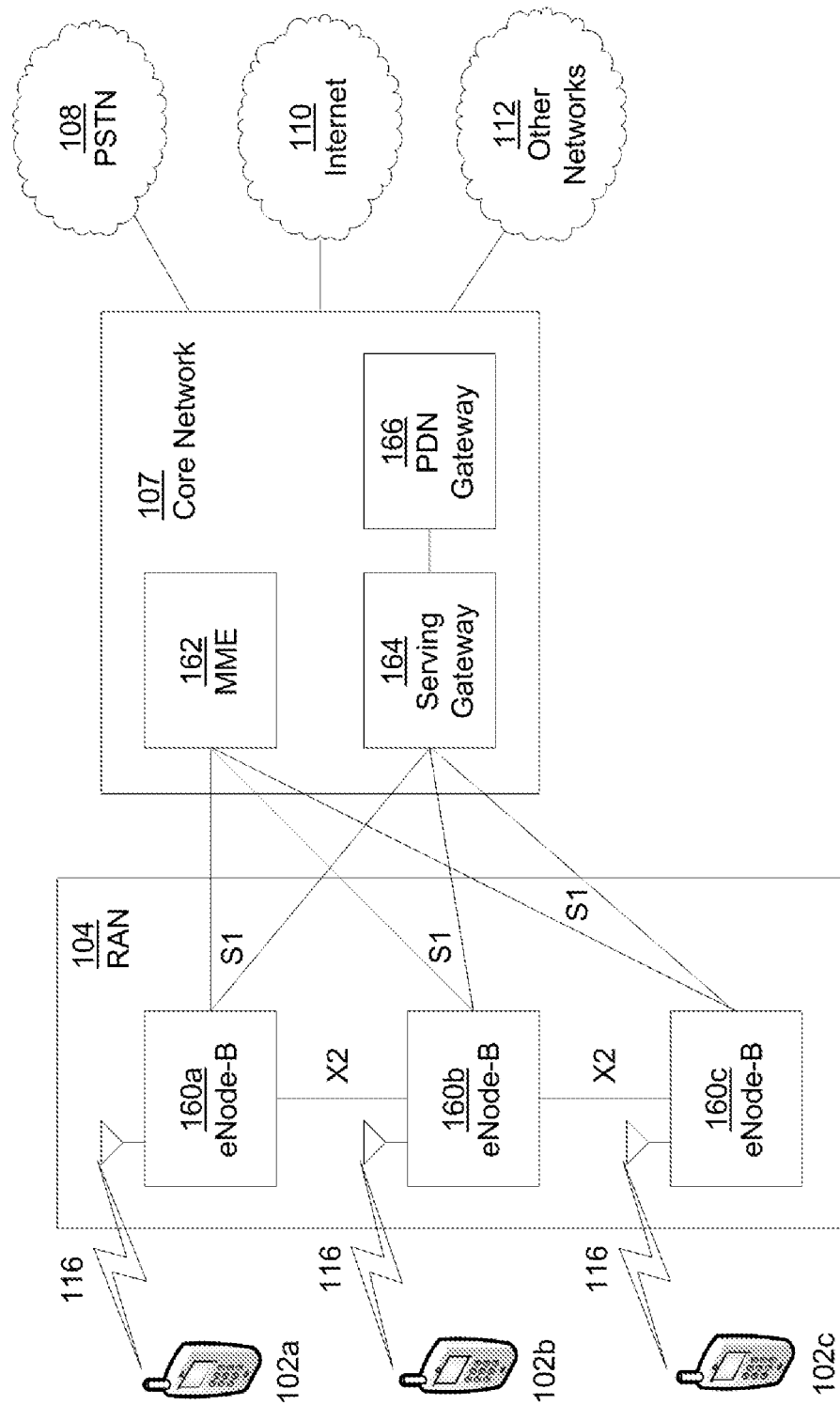
FIG. 1D is a system diagram of an example radio access network and an example core network that may be used within the communications system illustrated in FIG. 1A.

FIG. 1D is a system diagram of the RAN 104 and the core network 107 according to an embodiment. As noted herein, the RAN 104 may employ an E-UTRA radio technology to communicate with the WTRUs 102a. 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a. 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a. 102b, 102c and IP-enabled devices.

The core network 107 may facilitate communications with other networks. For example, the core network 107 may provide the WTRUs 102a. 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
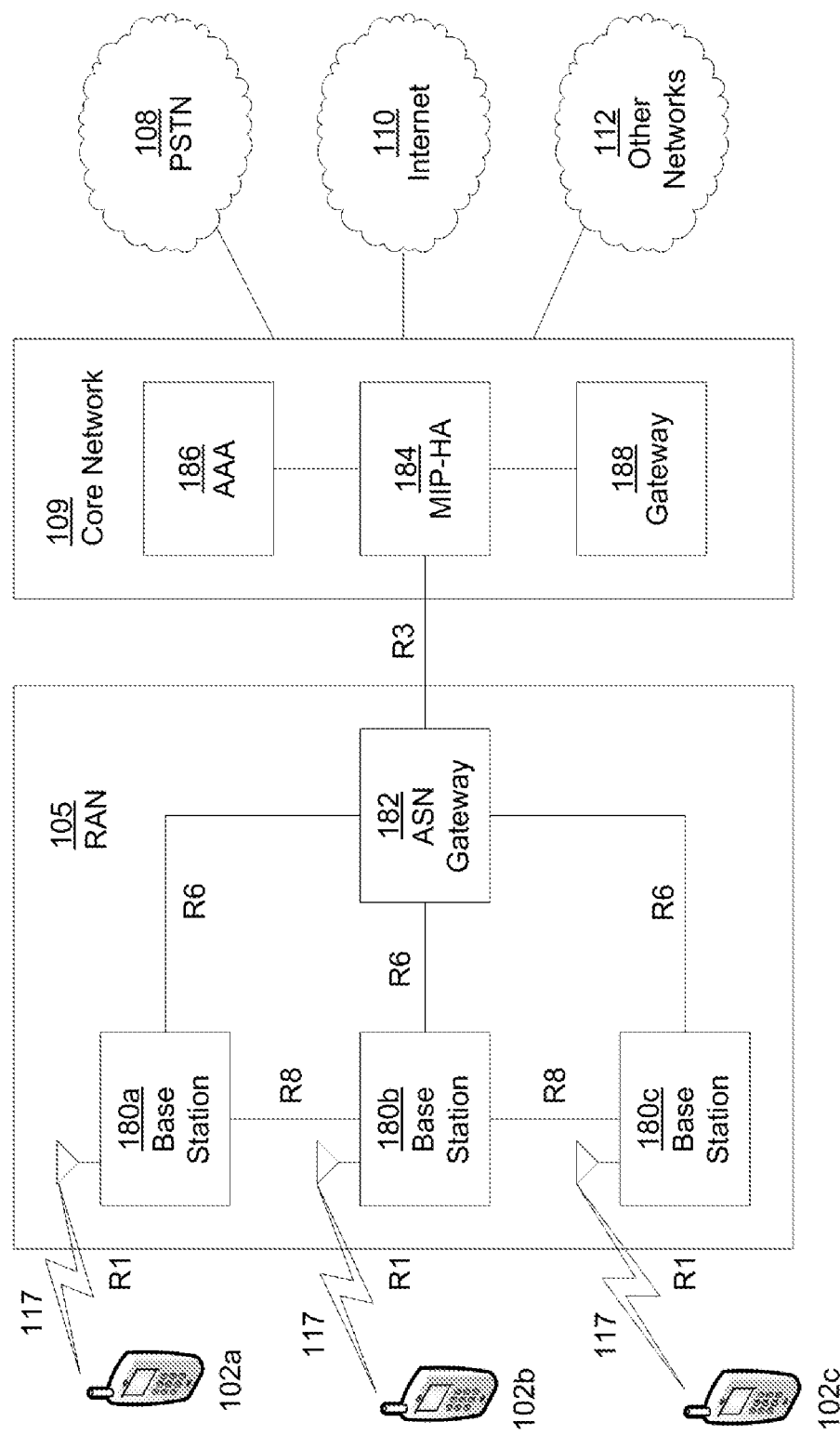
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed herein, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
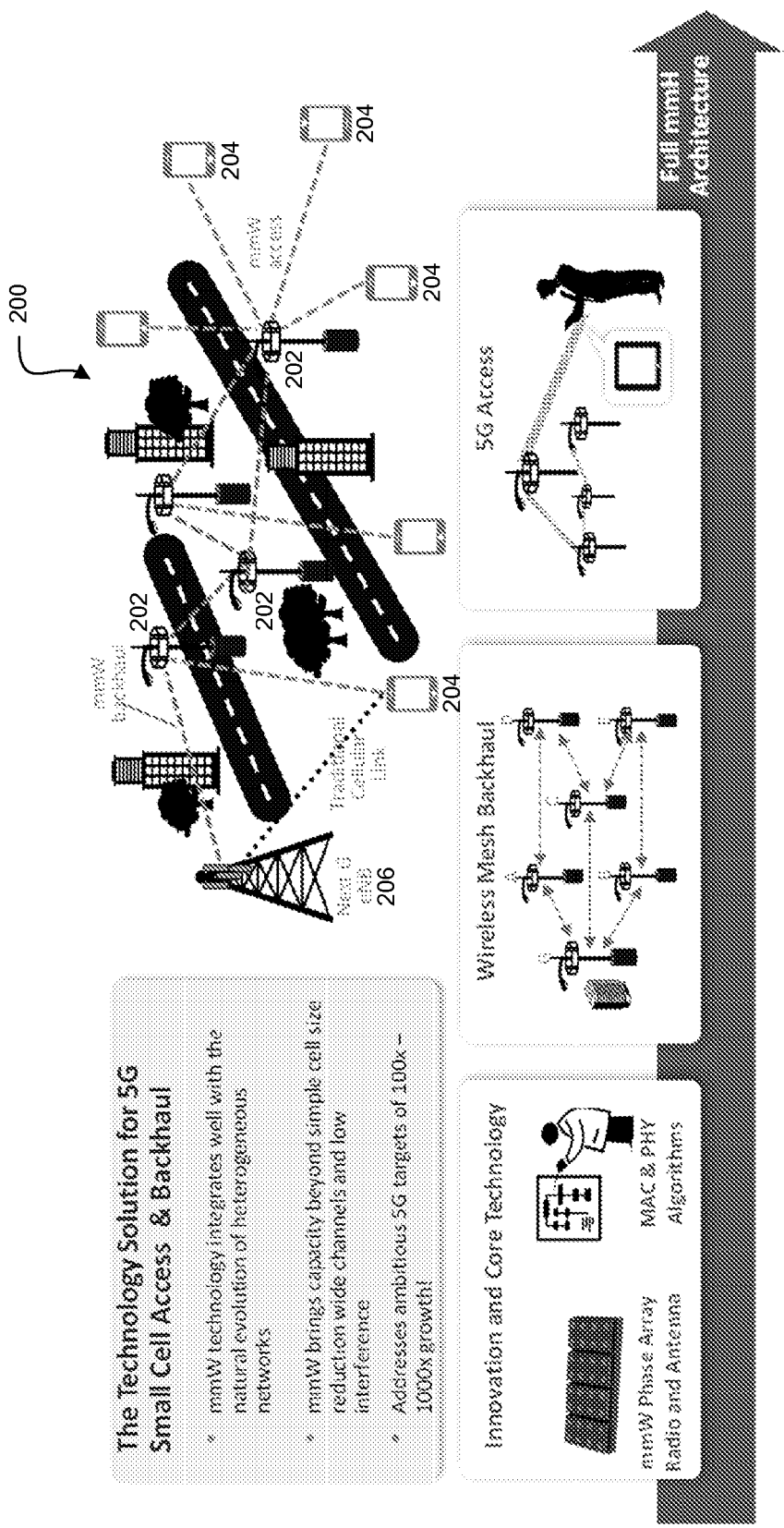
FIG. 2 is a diagram of an exemplary millimeter wave (mmW) communications architecture.

FIG. 2 is a diagram of exemplary millimeter wave (mmW) communications architecture 200. The mmW Hotspot (mmH) architecture 200 may be driven by a need for small cells and the use of mmW carrier frequencies. An mmH architecture 200 may include new small mmW basestations 202 that are overlaid on a cellular network comprising user equipment (CUE) 204 and an evolved node-B (eNB) 206. The UE may be a WTRU as described herein. The mmW basestations 202 may be denser than the traditional macro eNBs and self-backhaul using a mmW MESH network to the macro eNB 206 (or other wired/wireless aggregation point). Phased array antennas may be needed to close the links due to limited available Tx power and to provide a low interference environment and enable a flexible backhaul architecture. FIG. 2 illustrates that higher frequencies may be utilized to integrate mmW as part of natural evolution of heterogeneous networks.

Figure 3:
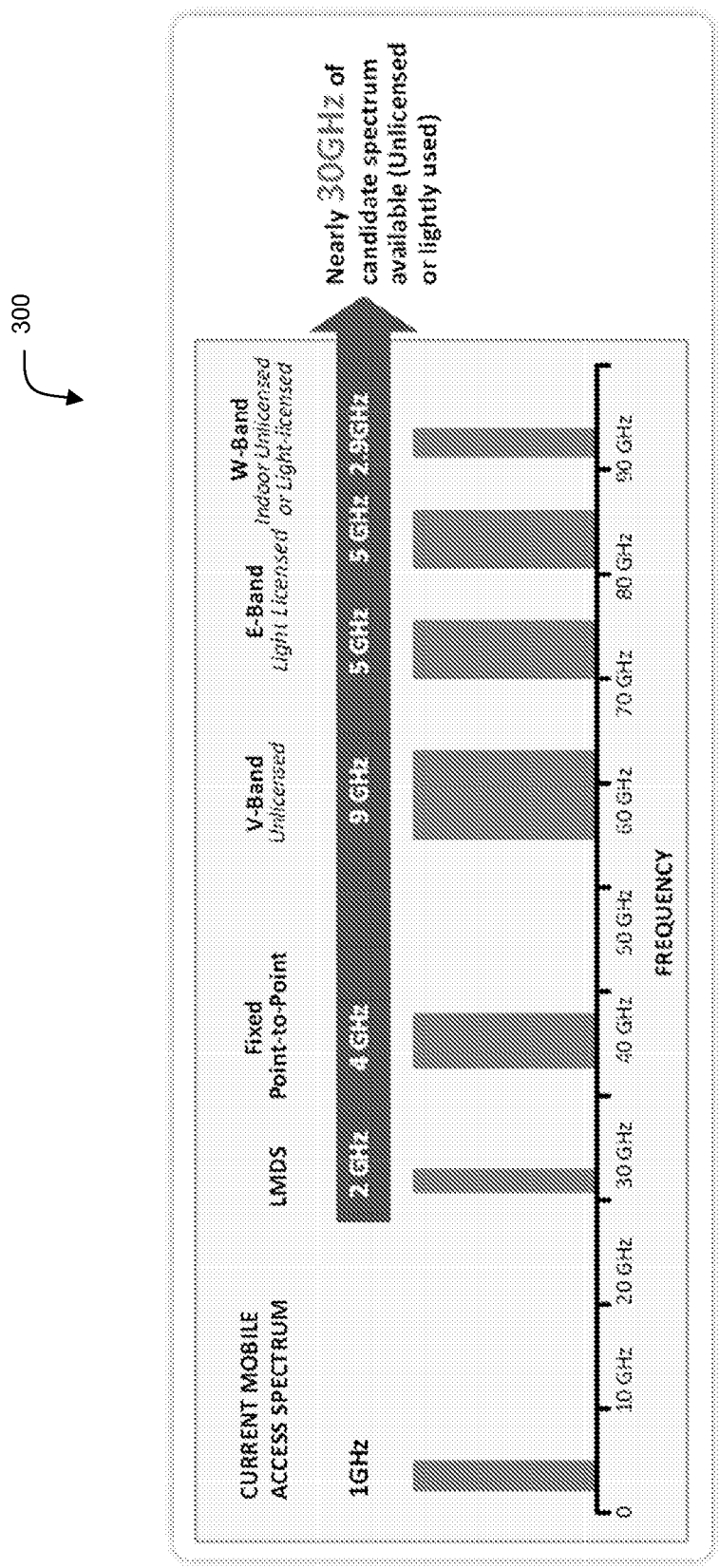
FIG. 3 is a diagram of mmW spectrum availability.

FIG. 3 is a diagram 300 of mmW spectrum availability. In the last few years, there has been significant amount of research and development in millimeter wave communications (mmW) in 28-30 GHz, 38 GHz, 40 GHz, 60 GHz and 70-90 GHz bands. The International Telecommunications Union Radio Sector (ITURP) under Working Party 5D (WP5D) is currently studying technical feasibility of IMT in the bands above 6 GHz, which is expected to lead to decisions for global allocation of licensed mmW spectrum, allowing for commercial use of these bands for mobile communications. Additionally, 60 GHz mmW bands are already available on an unlicensed basis, subject to national regulation limitations. FIG. 3 shows availability of about 30 GHz of candidate spectrum in mmW frequencies that may potentially be utilized towards cellular systems.

Figure 4:
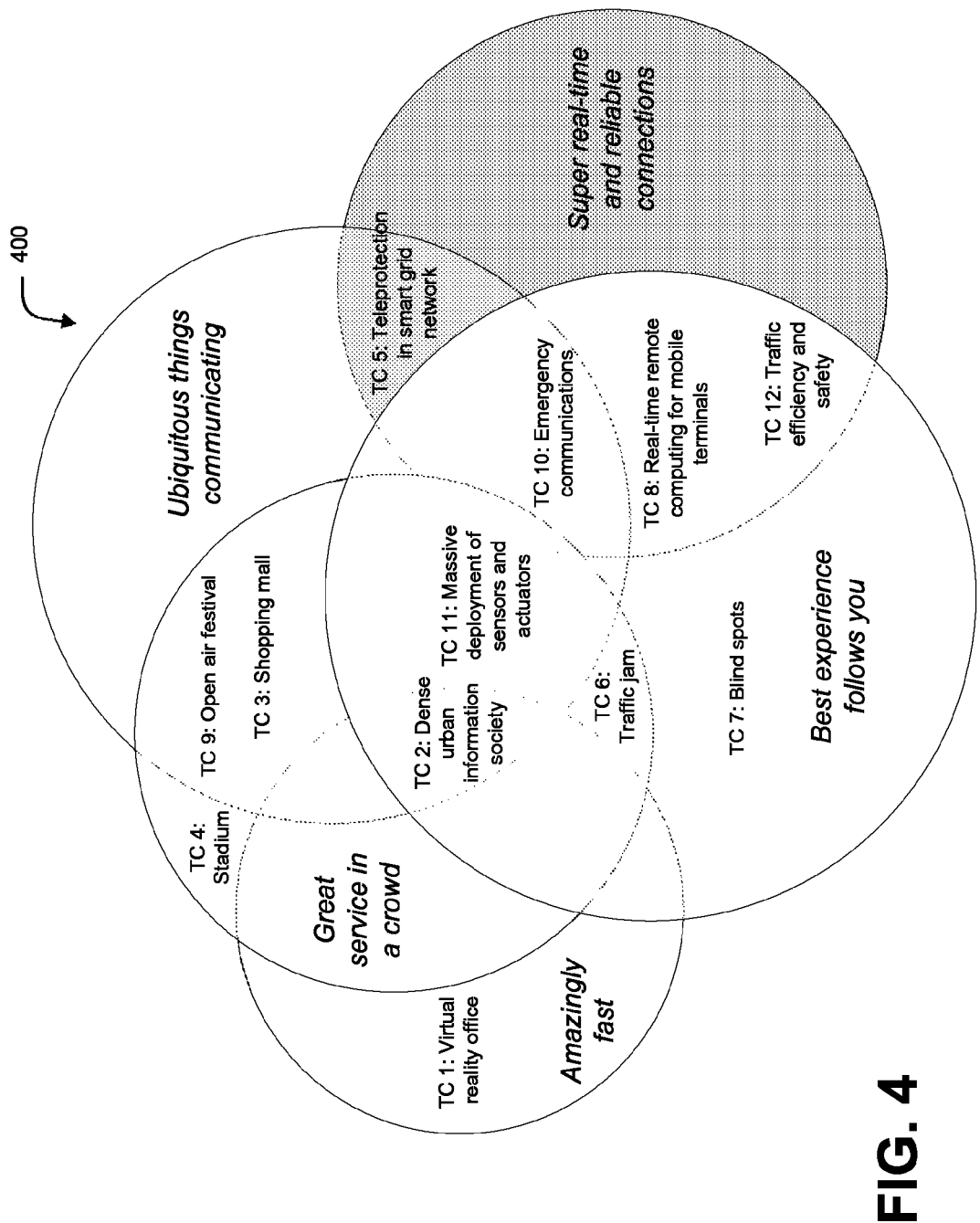
FIG. 4 is a diagram of use cases requiring support for very high throughputs.

FIG. 4 is a diagram 400 of use cases requiring support for very high throughputs. IEEE 802.11ad standard and 802.15.3.c standards have defined operation in 60 GHz unlicensed band. Millimeter wave communications may be a key technology enabler and disruptive technology for 5G. There are several EU funded projects (e.g., MiWaves, MiWEBA) and industry interest from major players, trying to apply both OFDM and single carrier principles to mmW systems with majority of the focus on physical layer techniques. The use-cases, new applications, and scenarios considered for 5G proposed by Mobile and wireless communications Enablers for the Twenty-twenty Information Society (METIS) and other European projects require support for very high throughputs at less than 1 msec latency in radio access network (RAN). This latency may be an order of magnitude lower than the current 4G systems.

Figure 5:
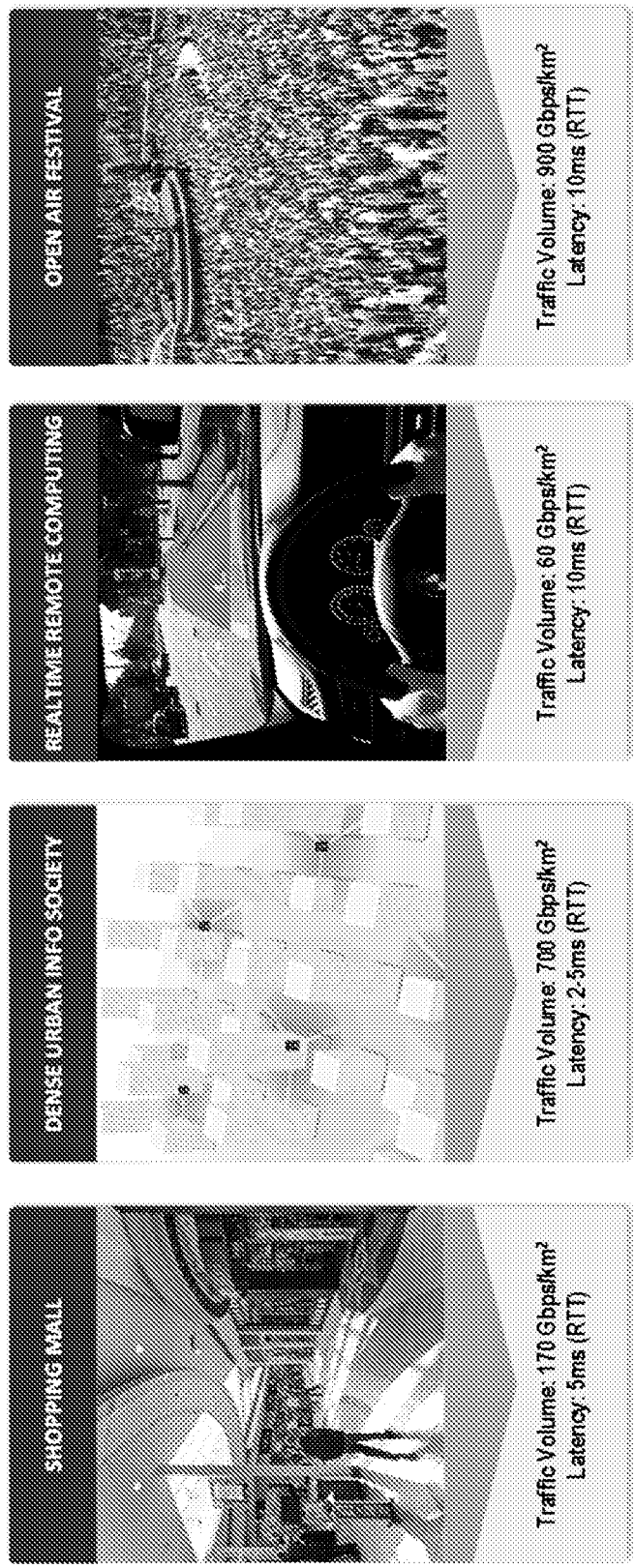
FIG. 5 is a diagram of indoor use cases and outdoor uses cases.

FIG. 5 is a diagram 500 of indoor use cases and outdoor uses cases. In order to make a mmW system capable of catering to new applications and 5G use-cases, with required support for seamless mobility and significantly high throughput, along with good resource utilization, focus on layer-2 and layer-3 aspects may be required.

Figure 6:
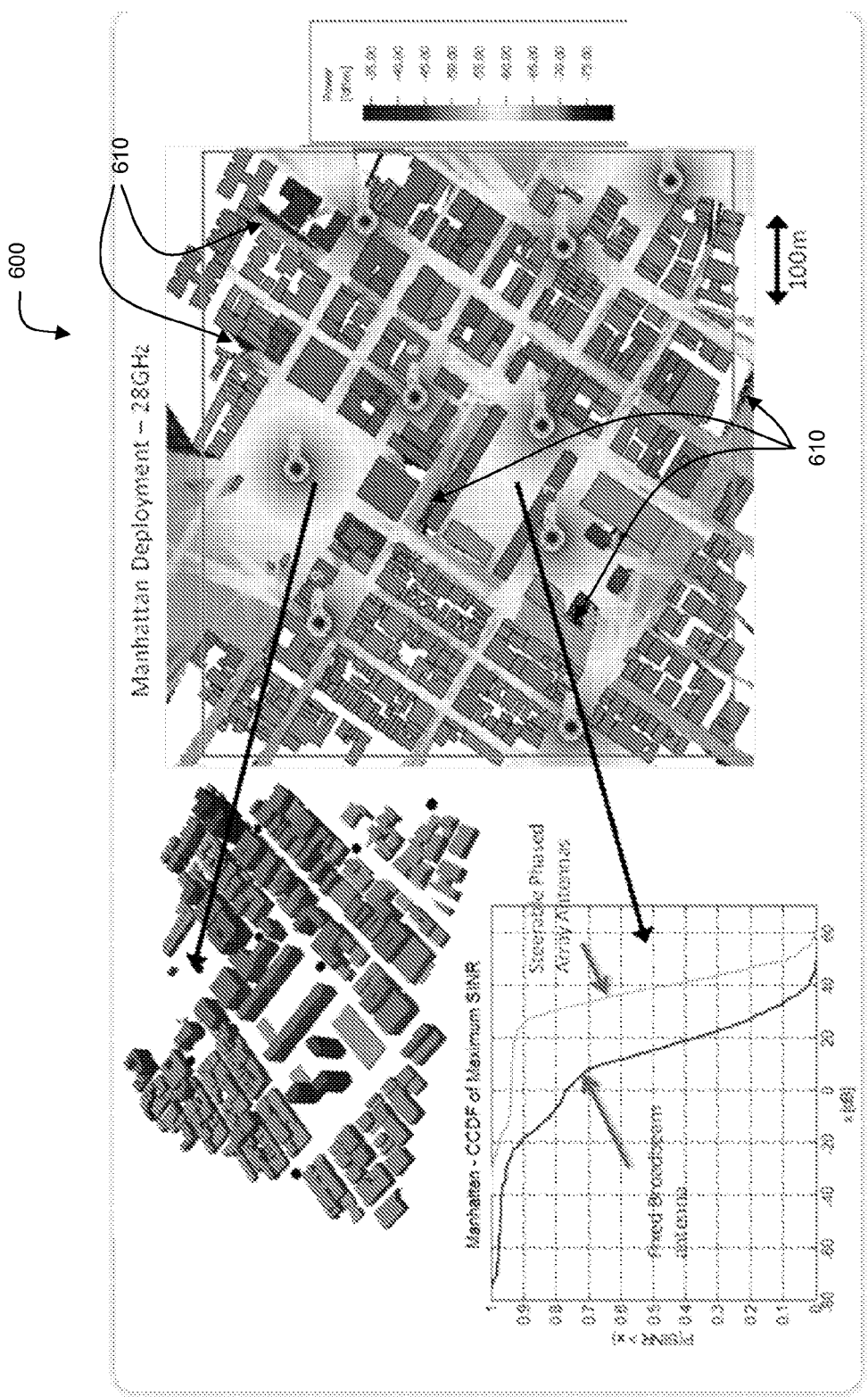
FIG. 6 is a diagram of signal to interference & noise ratio (SINR) in a given location.

FIG. 6 is a diagram 600 of signal to interference & noise ratio (SINR) in a given location. Directional multi-element electronically steered phased array antennas may be needed in mmW frequencies to overcome path loss, atmospheric absorption, track mobiles, and to steer around blockages (e.g., such as buildings, causing areas 610 of low signal strength). mmW mobility requires a paradigm shift compared to traditional mobility handling, as the need to change the current transmit and receive beam pair may not be due to mobility of the end user, but may be due to change in WTRU orientation, self-blocking by the user, change in environment with new blockers (e.g., human or vehicles), etc. These new challenges may require fundamental change in higher layer design, especially MAC, radio-resource management, and mobility aspects to handle the high directivity of mmW links. In FIG. 6, SINR distribution based on deployment in Manhattan N.Y. with a density of 15 mBs/sq·km (mmW small-cell base stations per square kilometer) is illustrated. According to the 802.11 ad 60 GHz single carrier transmissions for MCS 1-12 and OFDM MCS 13-24 in AWGN, the system is expected to operate between 0 and 26 dB at PER of $10^{-2}$ based on 8902.11ad. With steerable phased array antennas, FIG. 6 shows more than 90% probability of achieving an operable range of SNR.

Extending state-of-the art point-to-point mmW technology for a scalable network solution may require key enablers that are pursuant with the characteristics of higher frequency bands. An effective and configurable design that supports scalability may require sufficient information regarding the environment, e.g., topology of the network and status of the wireless medium. This may be achieved by new mmW based Radio Environment Maps (m-REM) to gather and store necessary network-wide information. The information may be utilized by the network elements and may allow vital network management procedures, such as software defined network management in conjuncture with incumbent technologies.

mmW technology may be used to identify the terrain where the network is located, and mobile or static objects in the area. Some use cases may be employed to determine a number of average number of people in the area, their mobility pattern, relevant information regarding the traffic, etc.

Figure 7:
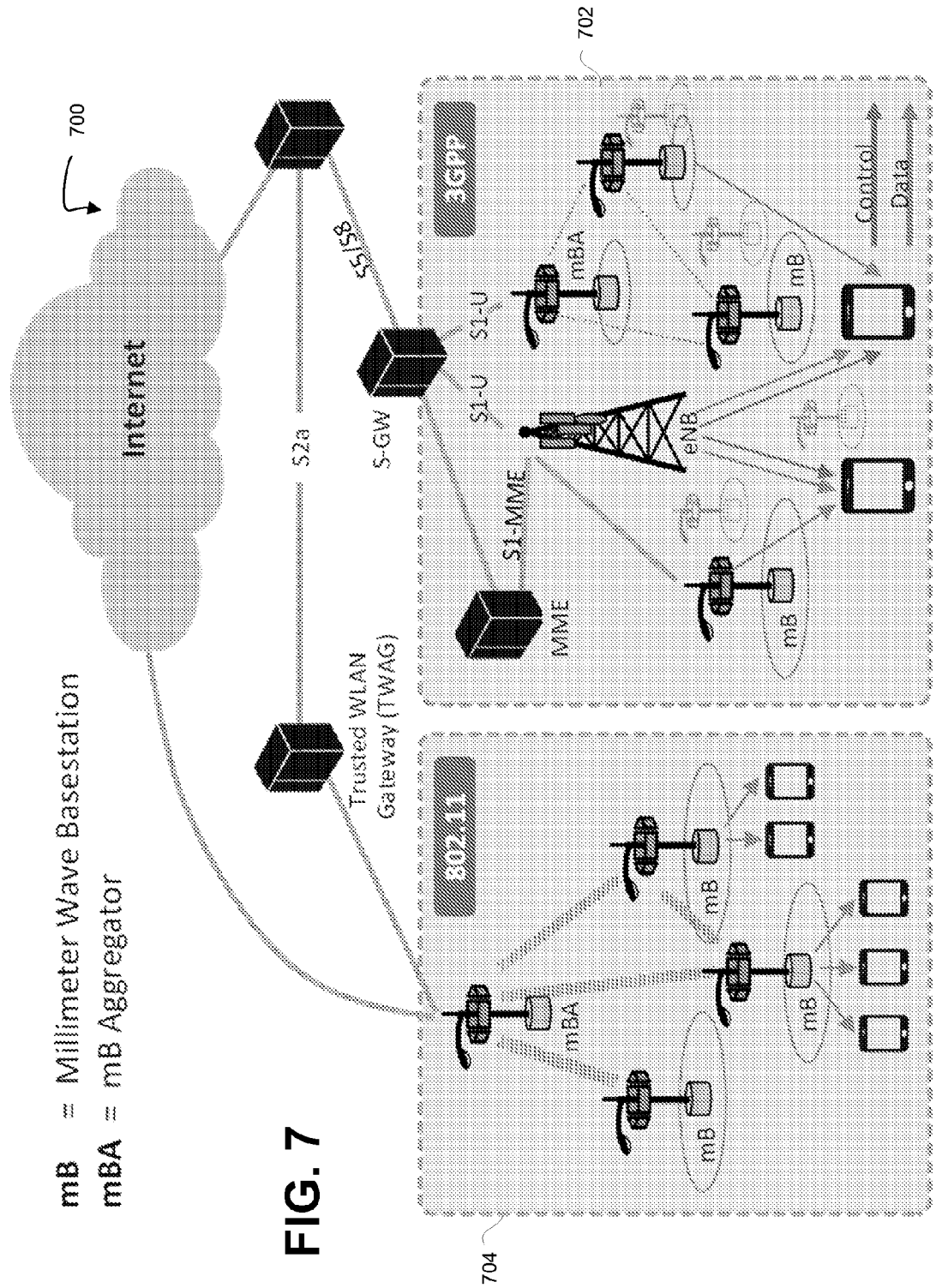
FIG. 7 is a diagram of an exemplary mmW 5G access architecture.

FIG. 7 is a diagram 700 of exemplary mmW 5G access architecture. In terms of system architecture, network integration of mmW small-cells for 3GPP cellular and Wi-Fi networks may be developed.

For a 3GPP approach 702, mmWave underlay may be integrated with RAN architecture (e.g., under existing macro eNBs and 4G small cells). Control plane functions may be handled by Macro eNB and additional data capacity may be provided by mmW small-cells. The mmW small-cells may either be co-located or non-co-located with LTE small-cells. This may have very little impact to the core network with S1-U interfaces going to both Macro-eNB and millimeter wave aggregator node (mBA). The mBA node may be introduced in order to eliminate the data-plane processing overhead from the macro eNB and to be able to scale from existing deployments for operators. FIG. 7 architecture may include benefits such as avoiding inundation of macro-cells to support very high throughputs at mmW layer; providing a transition path to build with existing infrastructure and not having to make the macro-cell bottle neck carry all the data traffic; allow the macro-cell eNB to be still responsible for S1-C interface and all required control signaling with the core; select that the mBA only has S1-U interface to the core and macro has both S1-C and S1-U; and ensure that a WTRU gets dual connectivity to mmWave small cells and macro/4G small cells.

For a Wi-Fi (802.11) approach 704, the mmW nodes may access the core network using existing standards based upon WLAN/3GPP interworking schemes. However, one difference may include introduction of mBA and mesh extension of existing (802.11ad) mmWave MAC/PHY to enable joint access and backhaul.

Given the high directionality of mmW frequencies and their innate dependence on the specific deployment scenario, environment. WTRU orientation, self-blocking and moving blocking objects, the current paradigm of stochastic based link assumptions may not lead to an efficient and robust system design and operation. The mmW system underlay system may be expected to be dense (~50 m to 200 m ISDs) with cellular overlay. For practical and efficient operation of such a cellular system with high directivity, medium access control, radio resource management and mobility handling may be handled locally within the mmW layer with SON capabilities such as self-configuration, self-optimization, self-healing etc., without having to involve the macro eNB in order to reduce inherent delays and overhead associated. A scalable mmW based system may prove cost effective in offloading the foreseen data explosion that may otherwise exhaust existing network infrastructures.

Ubiquitous and dense deployment of small cells accompanied with mmW capability and recent advances in electrically steerable phased-array antennas may open new horizons, not only in materializing high-speed data communication, but also in the ability to learn and share knowledge of the topography and spectrum usage in the network. Intelligent data extraction, sharing and processing techniques may yield a substantial amount of data that may be fundamental inputs to many machine learning algorithms with applications ranging from terrain mapping to object identification/localization. These features may extend the functions of mmW capable nodes from merely being standard communication points into network and environment screeners/sniffers.

Extracting the relevant information from external databases along with in-network mmW based measurement campaigns may be instrumental for the algorithms that specialize in object recognition and particularly human vs non-human/machine differentiation. Similarly, the mobility patterns (e.g., car density, speed, and direction), which may be determined by processing the data obtained through this process, may provide significant traffic data to be used by third party entities. Developing a feature that enables efficient utilization of radio environment maps for mmW based network management (whether centralized or distributed) is important. Radio environment maps may expedite the physical deployment of mmW based systems and yield holistic and relatively simple integration with the underlying and incumbent technologies.

Figure 8:
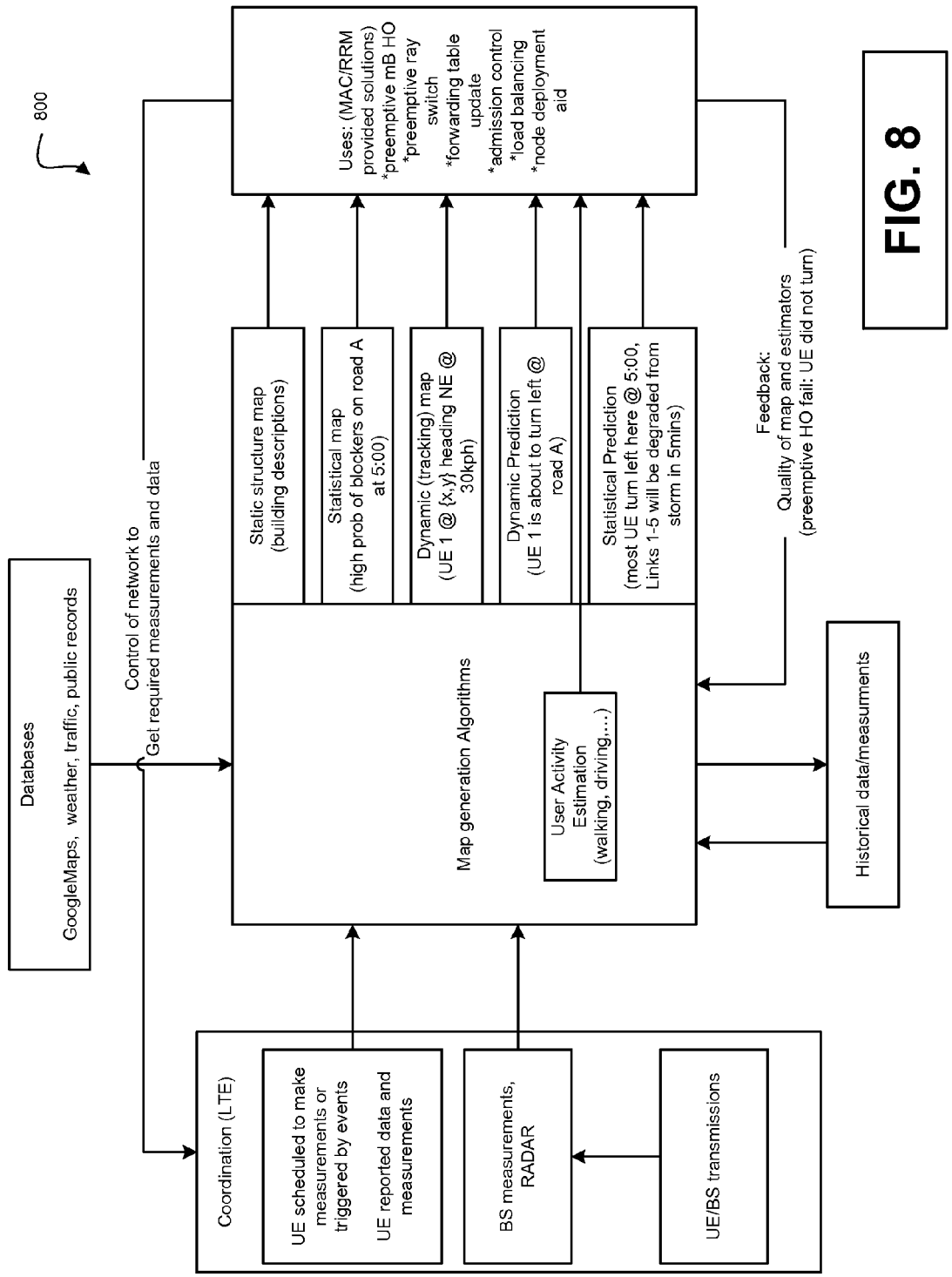
FIG. 8 is a diagram of an exemplary mmW functions and architecture.

FIG. 8 is a diagram 800 of exemplary mmW functions and architecture. A mmW system design approach may combine communication system design with deployment specific environment along with static and dynamic radio map information, RADAR and/or directional mmW measurements, dynamic tracking, and/or other measurement info from the WTRU (such as, for example, its location, orientation etc.). A radio map may be a set of data corresponding to a geographical region supporting a Radio Access Network or data regarding the mobiles within the region. This data may include characteristics about the mobile device, measurements from the mobile, location information, and/or other information regarding the mobile. Radio maps based on high frequencies such as mmW may be unique from that of lower frequencies. With high frequencies, the angle of arrival of the signal may become more of a factor. e.g., because directional antennas are used. This may require unique information being added to the REM relevant to the transmitter antenna patterns (which may be dynamic). This specification may use radio maps and radio environment maps interchangeably.

Topographical information that may include clutter, building data, street furniture with corresponding 3D digital map, etc. may be obtained from maps (e.g., structural maps) such as Google Maps/Google Earth and several other resources (such as, for example, computamaps.com, intermap.com, infoterra-global.com/telecomms, i3.com, leptonmaps.com, www2.jpl.nasa.gov/srtm/, vexcel.com, and openstreetmap.org).

Stationary objects, such as buildings and street furniture, may be defined in 3 dimensions. Properties of the objects may be recorded (such as, for example, reflection coefficient, surface roughness, dielectric constant, penetration loss, composition, etc.).

An exemplary REM may include a database of information organized according to a uniform 2D/3D grid that represents the geography surrounding the transmitter. Procedures for radio management may query this database to make decisions and evaluations for users currently located, or predicted to be located, in a given gridpoint. The information in the database for each gridpoint may include historical statistics from past user measurement (e.g., RSRP/RSRQ), current state of WTRU's known to be in a gridpoint, and/or other information. With directional antennas, this grid information may include a list of eNBs (e.g., mmW eNB, macro and small cell eNBs) that have coverage in a particular cell of the grid, and may include information about the antenna beamsteering configuration, e.g., in order to maximize signal quality for users located at a given grid point.

A WTRU may have measurement capabilities that may be enhanced for REM and MDT (minimization of drive test features). An mB may (e.g., may also) have measurement capabilities that may be enhanced for REM and MDT. REM measurement capabilities and data reporting by the WTRU may consist of RSRP/RSRQ captured with location, time of data, and cell identification information. In the eNB, measurement capabilities may consist of Received Interference Power, time difference of arrivals, Angle of Arrival (AoA).

With future spectrum using highly directional and steerable antennas, it may be desirable for the WTRU and mB (mmW eNB) to know the antenna steering configuration (e.g., beamforming weights) associated with the measurements on received channel conditions. The REM sounding period used for WTRU and mB REM measurements may include antenna state information in the REM measurement configuration parameters (e.g., FIG. 11).

Antenna state information may include at least one of transmitted power, beamwidth, azimuth of the transmitted beam, or elevation of the transmitted beam. The WTRU and/or mB may attach this information to REM measurement reports (include computing RSRP/RSRQ, SINR, SNR, etc.) as part of the REM sounding procedure. Antenna directionality between the Tx and Rx may be preserved with each measurement, and this "beam pair" information may be used to build intelligence into the REM.

Figure 9:
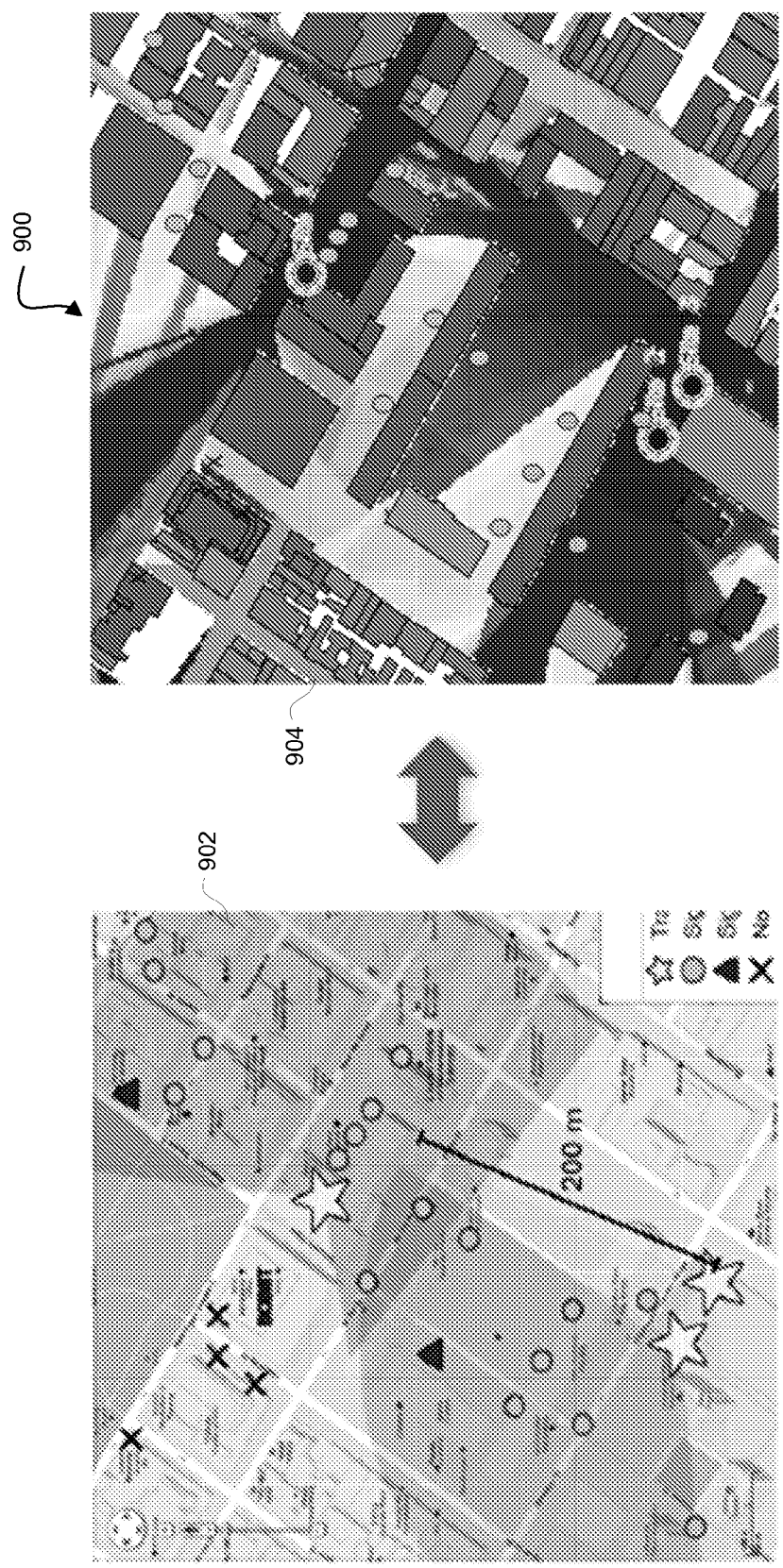
FIG. 9 is a diagram comparing ray tracing with mmW measurements.

FIG. 9 is a diagram 900 comparing ray tracing with mmW measurements. Ray tracing may allow deeper understanding of a specific deployment under consideration. Ray tracing may compute power, delay, and/or AoA/AoD information, which may be used as input to an REM Database. This technique may allow larger scale communication systems to be adjusted and customized, such as, for specific deployment under consideration. As an example, a small study was performed to understand how well ray-tracing data matches actual measurements in the field. The left-hand side of FIG. 9 is data showing a map 902 of Manhattan coverage of cells with radii of 200 m and their different sectors. Measurements were recorded for each of the 25 Rx sites from each of the three Tx sites (yellow stars). Signal Acquired (green circles) indicates that signal was detected and acquired. Signal Detected (red triangles) indicates that signal was detected, but low SNR prevented data acquisition by the system. No Signal (black Xs) indicates that no signal was detected.

The right-hand side of FIG. 9 is a plot 904 generated from ray-tracing data for the same transmitter and receiver locations. As the figure highlights, there is a correlation between measured data from the field and ray tracing. This further validates that ray tracing is an important tool that may be utilized to improve mmW communication system operation.

This signal information may be estimated from measurements. These measurements may be performed either by active measurements, sounding procedures (scheduled and opportunistic), or utilizing other sensing schemes. For terrain and mobility mapping, the mmw overlay may be composed of multiple infrastructure (mB) and mobile (WTRU) nodes that support directional transmission and reception.

For sounding, transmit receive beam pairing may be used. The directional transmission at higher frequencies necessitates efficient beamforming and beam pairing between transmit and receive nodes for data communication and/or efficient measurement sounding procedures. The paired beams correspond to refined beams with particular antenna weights and obtained as a result of beamforming and beam refinement procedures at the Tx and Rx nodes to maximize the signal power and link reliability in between.

In the sounding campaign, along with the measurement campaign schedule information, it is important to identify the beam pairs at the transmit and receive nodes to perform the measurement during these scheduled time slots. For the nodes in the network that have already performed beamforming/beam refining procedures before the measurement campaign, the Tx and Rx beam pairs that maximize the link capacity and reliability may be made available to: a central entity that carries out the measurement campaign, e.g., MME or an mB, where the transmit and receive nodes send the result of the beamforming/refinement procedure (e.g., Tx-Rx beam ids and/or antenna weights), to these nodes via particular management/control signals; the transmit and receive nodes exchange the optimal beam ids between each other.

At the REM sounding campaign, the entity (e.g., MME, mB, WTRU) that conveys the measurement scheduling and configuration information to the participating nodes may include the Tx-Rx beam pairs that may be used in the measurement campaign during the scheduled measurement slots. The beam pairing information may be based on the beam ids that are feedback from these nodes.

The measurement configuration information may include the transmit beam id along with the transmitting node id where the receiving node identifies the corresponding receive beam it may use during the measurement slots based on this information and the beam pairing information available to itself based on a previous beamforming, beam refinement campaign.

The measurement configuration information may include the transmit beam id, beam orientation, and/or antenna weights along with the transmitting node id where the receiving node identifies the corresponding receive beam it may use during the measurement slots based on this information as well as its location and orientation information. Depending on its location and orientation information with respect to the transmitting nodes transmit orientation, the receiving node may select a receive beam to be used during the measurement campaign.

Efficiency of a measurement campaign may rely on the accuracy of the Tx-Rx beam pairs identified with highest link capacity and reliability among these nodes. In order to improve the efficiency of the measurement campaign, beamforming/beam refinement procedures may be triggered before the measurement campaign in order to obtain the up-to-date beam pairs among the nodes that participate in the measurement.

To provide a beamforming/beam refinement triggering procedure to improve the measurement campaign accuracy, one or more of the following may apply. A node (MME, mB, and/or WTRU) in the network may transmit the measurement scheduling and configuration information to nodes that may participate in the campaign. Nodes may check the measurement scheduling and configuration information and decide whether to participate in the measurement campaign or not. Nodes that may be willing to join the measurement campaign may check the beamforming/beam refinement status corresponding to the other node(s) that may be transmitting the sounding signals. The status may identify when the beamforming/beam refinement procedures with the corresponding nodes were carried out. If these procedures are identified to be carried out longer than a threshold time value, the receiving node may transmit a beamforming initiation/triggering message to the node that transmits the sounding signal.

In WTRU-mB LOS sounding, WTRUs may be scheduled to transmit directional transmissions directly at non-serving mBs. The non-serving mBs may be scheduled to listen in the WTRU direction. The approximate location of the WTRU may be known either via GPS or other localization techniques. When the received signal is above a threshold, the path between WTRU and mB may be determined as LOS and free from interferers. The threshold may be a function of the estimated LOS distance from WTRU to mB. This procedure may be repeated for a plurality of WTRUs and mB. The collections of links from WTRU to mB may be accumulated to indicate all locations free of obstructions. The selection of WTRUs and mB to participate in this sounding may be based on their positions, e.g., WTRUs in locations that have not been previously sounded (or, for example, not recently sounded) may be selected. The mB or central controller may access the database of previous WTRU—mB locations that have been sounded to determine if a given WTRU should be selected. The mB or central controller may send a message to any other mBs that may be listening to the WTRUs transmission indicating when this transmission may occur. The serving mB may send the grant(s) to the WTRU to transmit to the indicated the mBs. The corresponding mBs may not schedule other activity so that they may be free to listen to the sounding WTRU. In the event that a mB is scheduled for a semi-persistent grant/allocation, it may omit or puncture the semi-persistent grant/allocation, nulling the grant as necessary.

While penetration losses with mmW propogation may often be problematic, if losses are not too severe (e.g., light vegetation, certain wood/glass structures) these Rx signals may be below the threshold but may still be received, and the lower measured power used to estimate the penetration loss on the LOS path. This may indicate a partial obstruction. With a large enough collection of such measurements (e.g., such as, LOS, partial obstruction, and full obstruction), computed tomography techniques (e.g., extension of the Radon transform) may be used to create a terrain map as experienced by the radio waves that propagate though it.

The sounding may be performed in both mmW and lower frequency (e.g., 2 GHz) bands. The channel estimates may be determined in each band and compared. LOS may be declared when the first significant path (above a given threshold) is at the same location in the channel estimates from both bands.

The WTRU-mB measurements in the network may be instantiated by the network itself, e.g., MME unit, serving mB, etc. The WTRUs and the mBs may be provided by one of these nodes with measurement scheduling information via corresponding control signals. The scheduling information includes at least one of: the transmission/reception time/frequency slot; suggested transmit power for transmission; and Tx/Rx beam width and orientation. These parameters may be determined by the network or WTRU itself alone or via coordination of network and WTRU based on the WTRU location, uplink/downlink traffic information, WTRU battery status, etc.

The measurement results may be pre-processed by the mBs and WTRUs to reduce the overhead. The measurement results (e.g., pre-processed results) may be transmitted to the network via corresponding reports. The pre-processing may be in the form of compression to reduce the amount and size of measurement data which may be excessive based on the REM requirements, e.g., mobility estimation every subframe, etc. The network node, e.g., MME, may jointly process the data obtained from multiple mBs and WTRUs to obtain sufficient information regarding the REM. Several state-of-the art network coding and machining learning algorithms may be utilized where the correlation between the measurement data obtained by various nodes is leveraged. This may result in reduction at the measurement related overhead, such that the MME would request particular mBs/WTRUs to join the measurement and to suggest particular measurement configuration information, e.g., Tx-Rx beam orientation, Tx power, range, etc. In the situation where additional information is needed, e.g., better resolution of the objects in the environment, the network may assign particular mBs and WTRUs which may participate in refining of these REM measurements. The network, based on the WTRU and mB traffic loads, may create refining measurement scheduling with new measurement parameters that includes: mB, WTRU IDs participating to this measurement campaign; and/or updated mB and WTRU Tx-Rx beam information which may include beam orientations and/or beam widths.

For mB-mB NLOS sounding, a mB may be scheduled to transmit, e.g., instead of a WTRU as described herein. LOS measurements may be supported in a similar way, but due to the fixed locations, limited mapping may result. NLOS measurements may be made, e.g., via reflections.

In scheduled sounding, the central controller or mB may check the environment map database to identify regions where more measurements are needed. The central controller or mB that wishes to measure the environment may send a message to other mBs to request their participation and propose time slots to use. A participating mB may respond by confirming the time slot(s) they will listen on. The transmitting mB may proceed to transmit in multiple NLOS directions, e.g., with precise timing. The receiving mBs may listen in multiple directions for reflections. The transmitting mB may be a receiving mB (e.g., by fast switching from Tx to Rx or by full duplex techniques). After the sounding sequence is complete, the measurements may be used to estimate the location of reflecting objects and their reflection coefficients. The AoD, AoA, power, and/or propagation time from multiple measurements may be used to localize reflecting/scattering surfaces. The collections of multiple such sounding campaigns may be combined, which may produce better estimates of reflecting/scattering surfaces.

In the event of a multiple reflection, it may be identified as such due to an inconsistent set of AoA, AoD, and/or propagation time values. Once identified as a multiple reflection, the data may still be used, since it sets constraints on the locations of the multiple reflectors and when combined with constraints from other measurements, the locations may be resolved.

Sounding may be opportunistic. The mB-mB sounding may be done in a partly or fully opportunistic way. In fully opportunistic mode, mBs that want to listen for reflections from other mBs may signal the other mBs they wish to listen for. The mBs that agree may continue to schedule WTRUs as usual, but may attach a field to transmissions, e.g., a special field to transmissions, which may tail the data packet (e.g., probe field). This field may include at least one of a time stamp, location of Tx, power, direction of transmission, or information about the Tx antenna pattern, and may be a different power level than data packet. This information may be explicit or implied from other information such as a node ID. The transmitting mB may transmit even without scheduling a WTRU, e.g., for the purpose of enabling more measurements.

In a partly opportunistic mode, the participating Tx mBs may respond to the listening mBs with estimated schedule information so that the listening mBs may increase the probability of listening in the right time slot and direction. For example, a transmitting mB may indicate to the listening mBs its semi-static allocations and which slots it may preferentially use for bursty traffic.

A WTRU may be used in place of the mB (e.g., the WTRU may be told to append the probe field to its data transmissions when it receives a grant) similar to mB-mB sounding. Although procedures may be described in terms of data transmissions, the probe field may be configured to be attached to broadcast and beacon transmissions.

The REM generation and its measurement campaign may be controlled/scheduled by the MME or an mB via opportunistic scheduling. The opportunistic measurement/sounding may occur during normal operation of the network and/or be based on a trigger by the network and/or WTRUs that determine a need for up-to-date REM information. For example, a WTRU, based on its traffic demand (e.g., augmented reality traffic with a stringent delay constraint which is to be requested in the uplink/downlink for a given duration), may send an REM measurement triggering message to its serving mB to be conveyed to the network controller, e.g., MME. The measurement campaign may be triggered by this message, and may be composed of mB-WTRU measurements, e.g., as discussed herein, as well as mB-mB measurements. For the mB-mB measurements, mB may transmit separate measurement probe signals or data packets with measurement fields appended as discussed herein to include at least one of a time stamp, location of Tx, power, direction of transmission, and/or information about the Tx antenna pattern in the field. The mBs in the idle mode may listen to the existing transmission in the network and perform measurement(s) based on this received measurement signal. The network may inform the receiving idle mBs with the transmit beam orientation of the transmitting mBs, to increase the accuracy of the measurement. With the location information of the transmitting mB available along with the transmit beam orientation, the measuring mB may determine an initial receive beam orientation, or the receive beam sectors with higher probability of reception, e.g., to minimize the measurement time or optimize its receive beam width accordingly.

Figure 10:
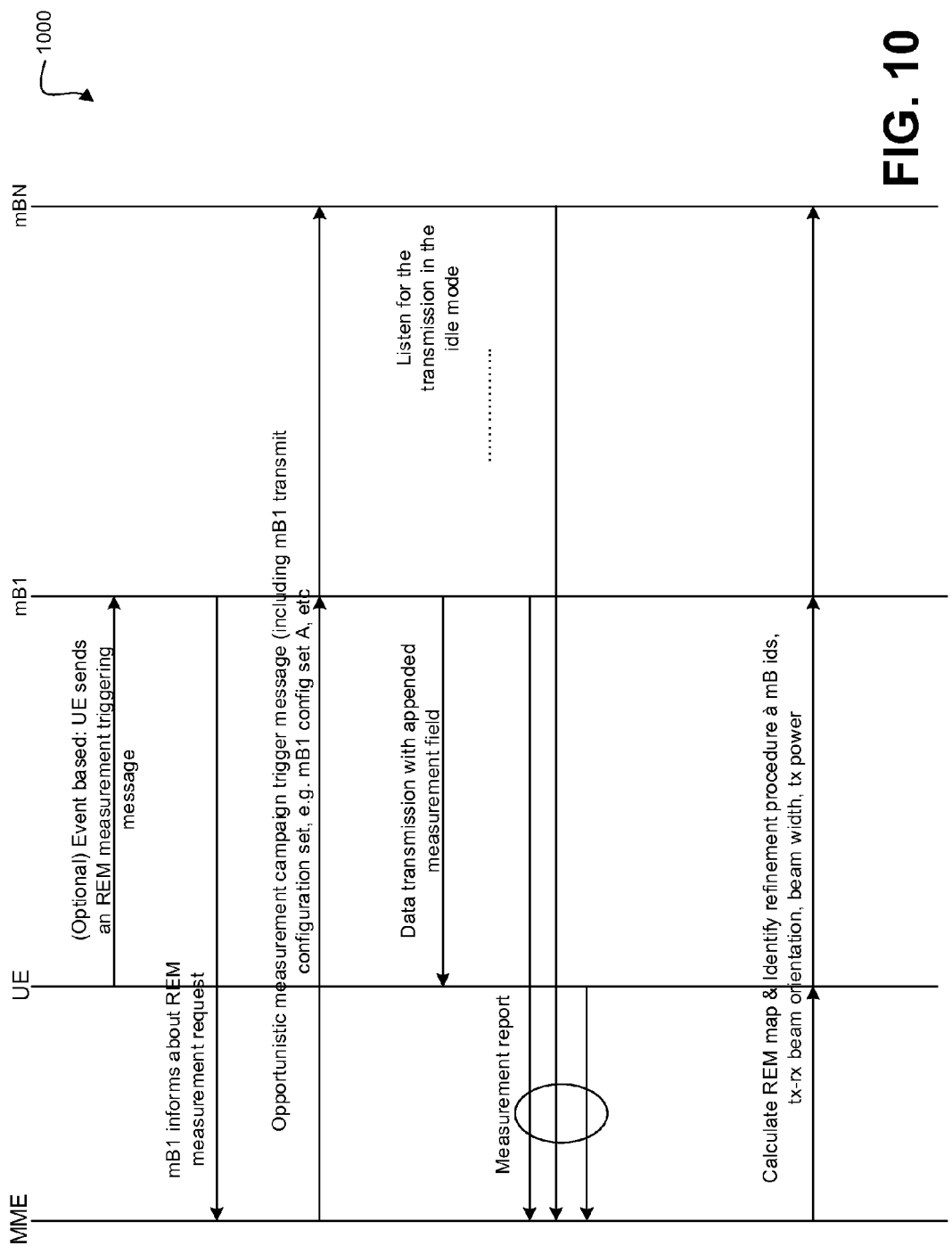
FIG. 10 is a diagram of an exemplary call flow for a network mobility management entity (MME).

FIG. 10 is a diagram of exemplary call flow 1000 for a network mobility management entity (MME) controlled opportunistic REM creation. The measurement results obtained at the measuring mBs (e.g., AoA, AoD, etc.), may be conveyed to the network via corresponding reports and the network may collate the data and process to obtain the REM with acceptable resolution. If further REM refinement is needed, the network (e.g., MME) may identify the mBs to participate in the refinement measurement campaign. In an opportunistic measurement campaign, these mBs may participate in the procedure as described herein, which may be supported with scheduled campaign to improve the REM measurement performance.

After identifying the initial REM, which may be in addition to which mBs may participate in the refinement procedure, the network control node may determine the measurement parameters to obtain the acceptable REM resolution. For example, the MME may suggest Tx-Rx beam orientation, beam widths, Tx power, measurement slots, etc., to the mBs to yield an acceptable REM map.

In the opportunistic measurement campaign, the idle nodes in the network, e.g., mBs and WTRUs, may listen to the environment to measure the signals (e.g., may be measurement signals or standard data/control signals) transmitted by the mBs to collect information regarding the REMs. This may be achieved by the mBs appending measurement specific fields into the data packets, e.g., time stamp, Tx power, phase information, and/or the mBs transmitting measurement probe signals in an event-based or in periodic manner, e.g., every TTI or multiple TTIs.

Figure 11:
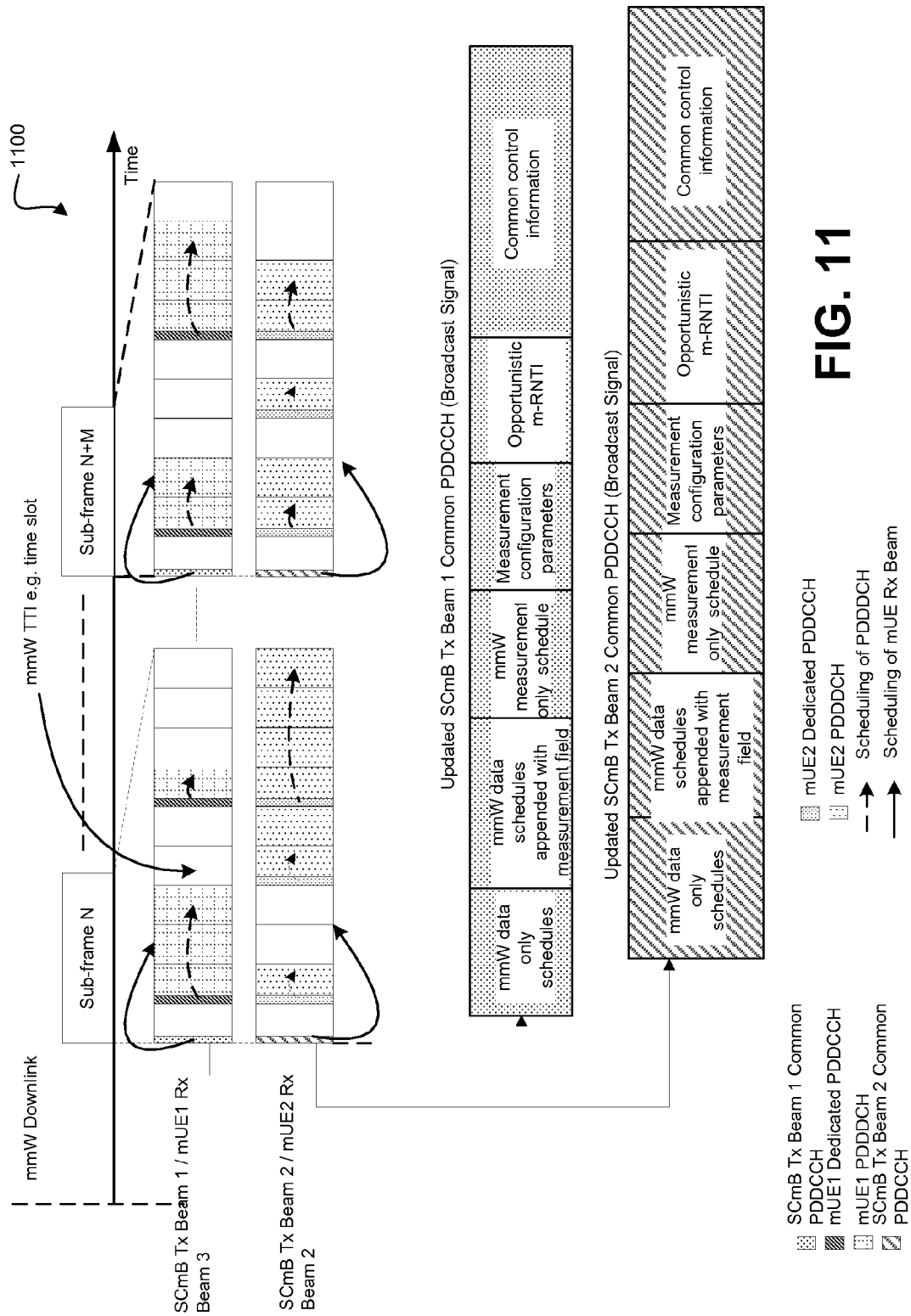
FIG. 11 is a diagram of an exemplary Physical Downlink Control Channel (PDDCH) field.

FIG. 11 is a diagram 1100 of exemplary Physical Downlink Control Channel (PDDCH) field. Dynamic predictive scheduling per beam pair and broadcast field including opportunistic measurement scheduling and configuration parameters are shown. mmW beacons may be used to transmit initial configuration messages to the WTRUs in the network, e.g., with the purpose of admission control, localization, etc. The mB beacon, that may be denoted as common control channel, may be transmitted by wide beams, e.g., to ensure reception by multiple WTRUs in the network simultaneously.

To convey the opportunistic measurement campaign configuration parameters to the mBs and WTRUs that potentially join the measurement campaign, these parameters may be appended to the pre-scheduled common control channel data frames to be transmitted each sub-frame (e.g., 1 ms) or in multiple sub-frames. The mB, that is to transmit the measurement probe signal, may insert opportunistic measurement campaign parameters and opportunistic measurement RNTI to the beginning of the subframe assigned for its WTRU (e.g., ScmB Tx Beam 1, etc.), for example in the so-called common control frames. Due to the wide Tx beam assigned for this common control signal, the surrounding network nodes may be able to receive and detect the opportunistic measurement RNTI and determine the REM measurement configuration parameters including at least one of: a measurement probe transmission schedule during the mmW subframe and/or reception configuration parameters suggested to the nodes that may wish to participate in the opportunistic measurement campaign. Parameters may include Tx beam orientation, Tx beam width, and/or Tx power that the mB will use during these time slots.

Figure 12:
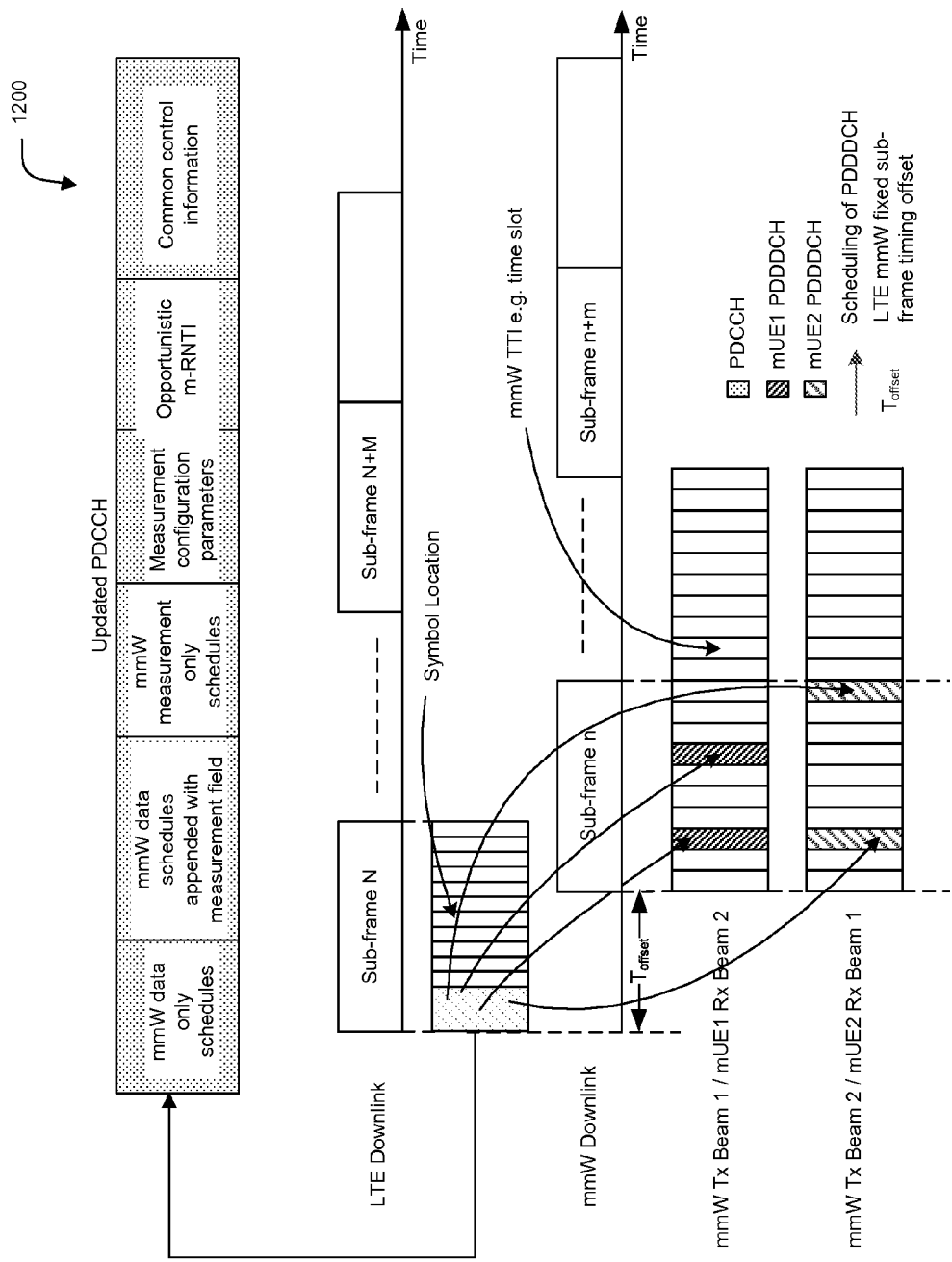
FIG. 12 is a diagram of an exemplary PDDCH scheduling.

FIG. 12 is a diagram 1200 of exemplary PDDCH scheduling and broadcast field including opportunistic measurement scheduling and configuration parameters. In a dual-connectivity architecture, e.g., nodes connected via LTE and mmW, the PDCCH field may be updated to include the opportunistic measurement configuration parameters along with opportunistic m-RNTI. The nodes may identify the measurement scheduling and Rx configuration parameters by listening to the PDCCH and participate in the campaign accordingly.

A node (e.g., one or more mBs and/or WTRUs) receiving the common control channel may, for example upon receiving and decoding the corresponding measurement configuration information from the common control channel (e.g., updated common PDDCCH, or PDCCH) identify the measurement scheduling slots in which the mB will transmit the measurement sounding signals. A node receiving the common control channel may be in an idle state or a connected state. Node(s) using the dedicated control channel (e.g., dedicated PDDCCH or dedicated PDCCH) may identify the transmission scheduled at them. A node receiving the dedicated control channel may be in a connected state. Based on the information determined from the common control channel and/or the dedicated control channel, a node may be able to identify the idle slot(s) and hence on which slots it may be able to join the opportunistic measurement campaign. If a node identifies available slots utilizing the common and dedicated control channels, the node may send a feedback signal to the node collecting the measurements (MME or mB) suggesting its acceptance to join the measurement campaign. During the slots that the nodes participate in the measurement campaign, Rx parameters, e.g., Rx beam orientation and beam width, may be configured. These parameters may be further refined based on the node location information and historical data, such as transmitting mB-node link gain, topography information, etc.

The REM measurement campaign may be carried out in periodic, semi-periodic, or event-triggered, basis. In the periodic measurement example, based on the requested REM features (e.g., to support low-latency applications, high granularity data), the measurement configuration parameters may be transmitted in every, multiple, or periodic (e.g., in each xth subframe) subframes. To reduce the overhead associated with the campaign, the measuring nodes may send the measurement reports in longer durations (e.g., for a measurement request/configuration message transmitted every subframe (e.g., 1 ms), the report may be sent back to the node every N TTI, e.g., every 5 ms with N=5).

The measurement configuration parameters transmitted by the mB or MME to the measuring nodes may be selected from a pre-defined set, which may be available to all nodes in the network. This may reduce the overhead. The node that is initiating measurement may, instead of sending multiple configuration parameters (Tx beam direction, width, Tx power, range, sector, etc.), transmit a configuration set index, e.g., config set T. The receiving (measuring) node may identify the detailed configuration parameters from this config set index.

The probe field appended to a packet and the probe packet (which may be transmitted specifically for sounding) may be specially designed to be detectable in low SNR conditions. A long repeating pattern may be used for a preamble that permits a combination coherent and non-coherent combining to recover timing information (e.g., 100 receptions of a 256 sample code with low cross correlation peaks). The data portion may be spread with a large spreading factor code. The data portion may be scrambled with another code. The codes used may be identified as part of the negotiation phase to set up a sounding campaign and may be node specific, e.g., to help randomize interference and aid in identification of the transmitting source.

The attenuation of sounding signals measured during rain may be used to measure integrated rainfall rates along the measurement path, which may provide high resolution rainfall data.

Silent periods may be scheduled for passive sensing of the radio environment for mmW. These may be coordinated across neighboring mBs. During these periods, the field of view may be scanned over azimuth and elevation in discrete increments such that the whole field of view may be covered over the course of multiple measurement periods. Certain objects (e.g., humans) may be larger radiators of mmW energy than others. The collected measurement data may use utilized for object detection.

The mapping information provides probability of mobile objects acting as blocker occupying spatio-temporal coordinates. The mapping information may provide a priori information about the likelihood (e.g., when and where) of blocking by mobile objects. This may provide a priori information about the likely WTRU (when and where) based on historical information drawn from databases such as historical vehicle traffic reports, historical RADAR data, historical WTRU reported data or prior based on current WTRU location. This historical information may include probability of mobile data traffic load and QoS requirements. Additional information may be drawn from historical WTRU location data.

WTRU prediction and its usage of radio resource such specific transmit and receive beams may be useful. For example, predictions about typical WTRU dynamic behaviors, such as, at the current time, 75% of WTRUs in mB1 will turn right at location {x1, y1, t1} HO from mB1 to mB2 via LOS path. Predictions about network performance and loading, such as a per-link degradation profile prediction due to rainfall (dB loss vs time of day for each link), may be useful. Particular video expected to be viewed in high concentration by users (edge caching opportunity) may be useful. Dynamic WTRU prediction may provides likely individual WTRU behaviors (e.g., WTRU1 (which is currently being tracked at {x0, y0, t0}) will turn right at location {x1, y1, t1} with probability X % and require HO from mB1 to mB2 via LOS path).

Techniques may be utilized for obtaining WTRU localization, WTRU orientation, user activity estimation, object localization, ray tracing mapping, and computed tomography.

WTRU localization information may be obtained. A WTRU may report its location from GPS candidates. The network may schedule a WTRU to measure GPS data periodically and append to PUSCH messages if already scheduled. The update rate may be adjusted by the network depending on the WTRU velocity, location, etc. The update rate may be increased whenever tracking/predicting WTRU location is expected to be more difficult. Quiet periods in the UL may be introduced to enable multiple mBs to listen for signals from WTRU to be used for triangulation and trilateration based localization of the WTRU. Such a WTRU may schedule to transmit in a certain direction (e.g., using wide beams or multi-lobe beams to try and capture as many as possible mBs in the transmission)

WTRU orientation may be as useful as WTRU location due to limited coverage angles that may be supported by many types of mmW antennas (fixed or PAAs). There may be a host of sensors on WTRUs including, by way of example, accelerometers, gyros, and magnetometers. A WTRU may compute its orientation and spin rates and report this along with GPS data. If combined with the knowledge of the antenna characteristics, preemptive HO and/or beam selection may be performed.

User activity estimation (other than data services) may be useful. The activity of the user may affect QoS, HO, etc decisions made by the network. The activity of the person (such as, for example, walking, sitting, driving, on train, running, stair climbing, laying) may be estimated by sensor data. The estimation may be done in the network based on raw or minimally processed sensor data, or be estimated in the WTRU and reported to the network.

Object localization may include RADAR trilateration and/or super resolution AoA estimation.

Ray tracing mapping may include primary AoA/AoD of primary (e.g., a LOS) path and secondary (e.g., lower power Non-LOS) paths estimation; super resolution techniques at nodes with advanced PAAs (many ADCs); and/or sequential nulling at nodes with single baseband chains.

Utilization of database information corresponding to the terrain/topography, ray tracing information and/or radio measurement campaign by the corresponding network elements may include a radio measurement campaign (such as, for example, a transmit node(s) sending the probe signals and a receiving node(s), including itself, identifying the terrain via the received signals).

The radio measurement results may be combined with a database available to the network and/or measuring network element. The database may be in static, semi-static, or dynamic fashion, e.g., updated in varying timing intervals by the database owner/provider. The processing units in the network may be responsible to process the information obtained by the database and the measurement results. The processing unit may be the measuring unit itself, e.g., mmW capable access-point. The processing unit may be another network element which may be part of an existing infrastructure or a separate network entity that may be plugged into the network.

A corresponding network element and/or processing unit may access a database, such as Google Maps, to obtain 3D maps of the terrain where the network is able to cover (e.g., manage to perform measurement campaign).

The processing unit may combine relevant information obtained from the database and from the measurement campaign to create a refiner terrain map and radio environment maps. Using the measurement results, the processing units and/or the network may update the database information. For example, 3D maps obtained from the Google Maps database may be updated to include fine details such as small objects, textures of the buildings, and radio characteristics such as reflection/diffraction coefficients, etc.

Figure 13:
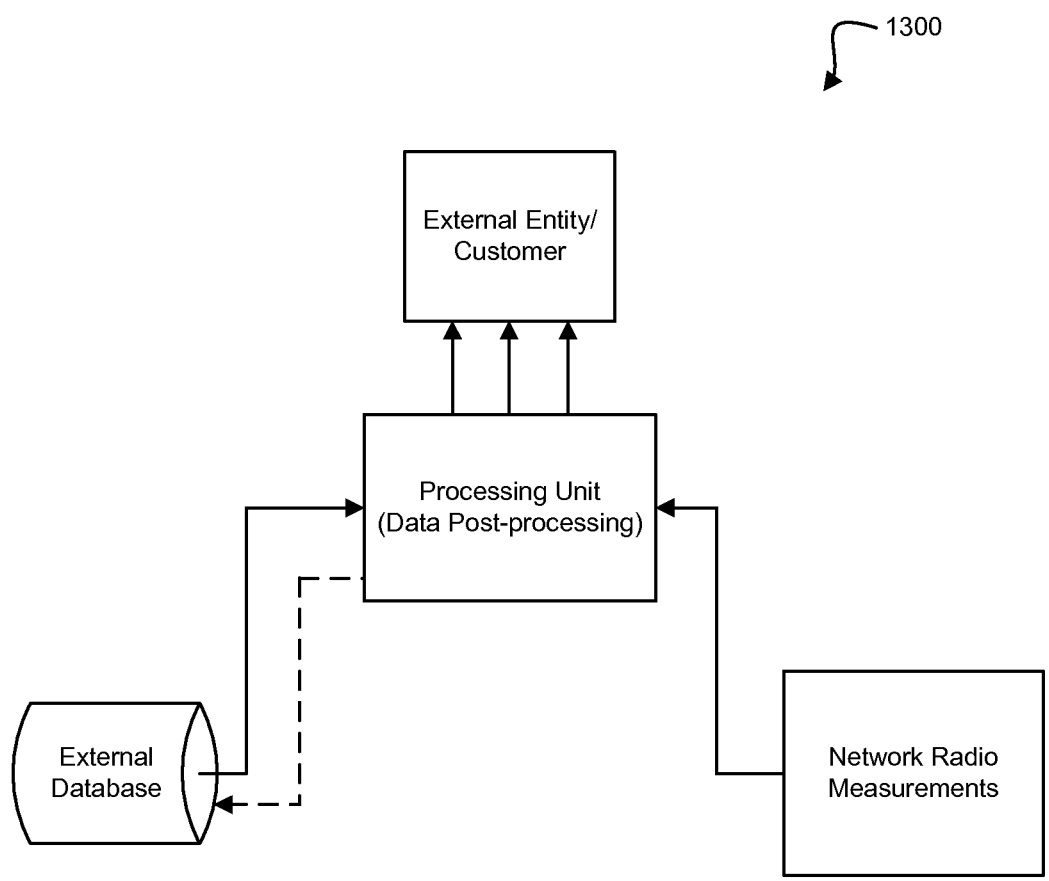
FIG. 13 is a diagram of an interaction between an external database, network measurements, and an external entity.

FIG. 13 is a diagram of an interaction 1300 between an external database, network measurements, and an external entity. The interaction between the database and measurement results may be based on an interface with specified input/output relationships. The measuring network node may be a mobile unit, e.g., mmW capable station, as well as a static network element, e.g., mmW capable access point. For the mobile units, the measurement results may be processed at the node by accessing the database which may be obtained from a dedicated data connection or via an access point where the measurement results may be exchanged.

To determine the mobility of the objects in the environment, a processing unit may obtain the static map from an external database such as Google Maps 3D. In the network, a radio measurement campaign may be employed to identify the terrain and the objects. The measurement campaign may be performed when a limited or no mobility pattern is expected, e.g., after hours in the city, etc. The measurement campaign may identify the static terrain as well as smaller objects which may not be obtained via the external database. The radio environment measurements may be compared and joint processed with the information obtained from the external database in order to have the static and detail mapping of the terrain. This information may be stored in the network.

For the mobility pattern identification and moving/temporary object determination, the network elements may carry out radio measurement, e.g., where one or more of the following may apply. The network may perform a radio measurement campaign in predetermined intervals in order to obtain multiple information sets regarding the terrain. Each set may be compared with the static radio environment map obtained via the combination of external database information and previous measurement campaigns if limited mobility. The processing nodes, using these data sets, may identify some information (e.g., coarse information) regarding the objects that possibly may not be part of the static network. Examples of this information may include e.g., approximate location, average size, average speed, etc. The processing may be done by a single node in centralized manner, or jointly by multiple nodes in the network each with distributed processing capability.

With the approximate and average information available, the processing elements in the network may be adapted for more configured measurements. In a centralized control, the network determines which measuring units may be operative and their measurement scheduling and parameters. Particular cluster(s) of the network may be activated where measuring units may be assigned with schedules for the transmission/reception, transmission directions in terms of beamforming orientations, the beam widths, etc. In distributed operation, the measuring unit may independently participate in the detailed measurement procedure based on the average and approximate information obtained from the network.

Radio environment mapping may be enhanced to include an object identification feature. The measurement data may include necessary parameters to analyze the object for a possible categorization. For example, the processing unit may be able to distinguish humans and machine users by processing of the reflection parameters and path-loss outcomes. The measurement campaign may be optimized based on the specific objects, such as humans, to be identified. One or more of the following may apply.

A radio environment measurement campaign may be carried out by the network (e.g., as described herein) and the processing units may obtain the data from the measuring units. Based on the available data, the processing units may attempt to identify the object. If not successful at the initial processing attempt, the processing unit may request additional information from the other processing units, measuring nodes and receive additional temporal information. The processing node may initially identify the mobility pattern of the object and inform the geographically close nodes with the additional measurement request. The additional information may be used for another attempt to identify the object.

A measurement campaign may be configured with the focus on additional information extraction from the object, e.g., facial recognition in a human object. The processing unit may request a new network configuration and measurement campaign tailored to the focused measurement. The new configuration parameters may be beam orientation, beam width, and transmission power.

To collate and process mmW radio environment map information within the operator network, a mmW REM application domain, 3GPP core network domain, 3rd party domain and mmW access network domain may be provided. The mmW REM application domain represents applications which may want to utilize mmW REM data. This architecture may facilitate in presenting a consistent interface to the applications which may utilize the mmW REM information and to third party database content providers which may be used to enhance the mmW REM information.

Figure 14:
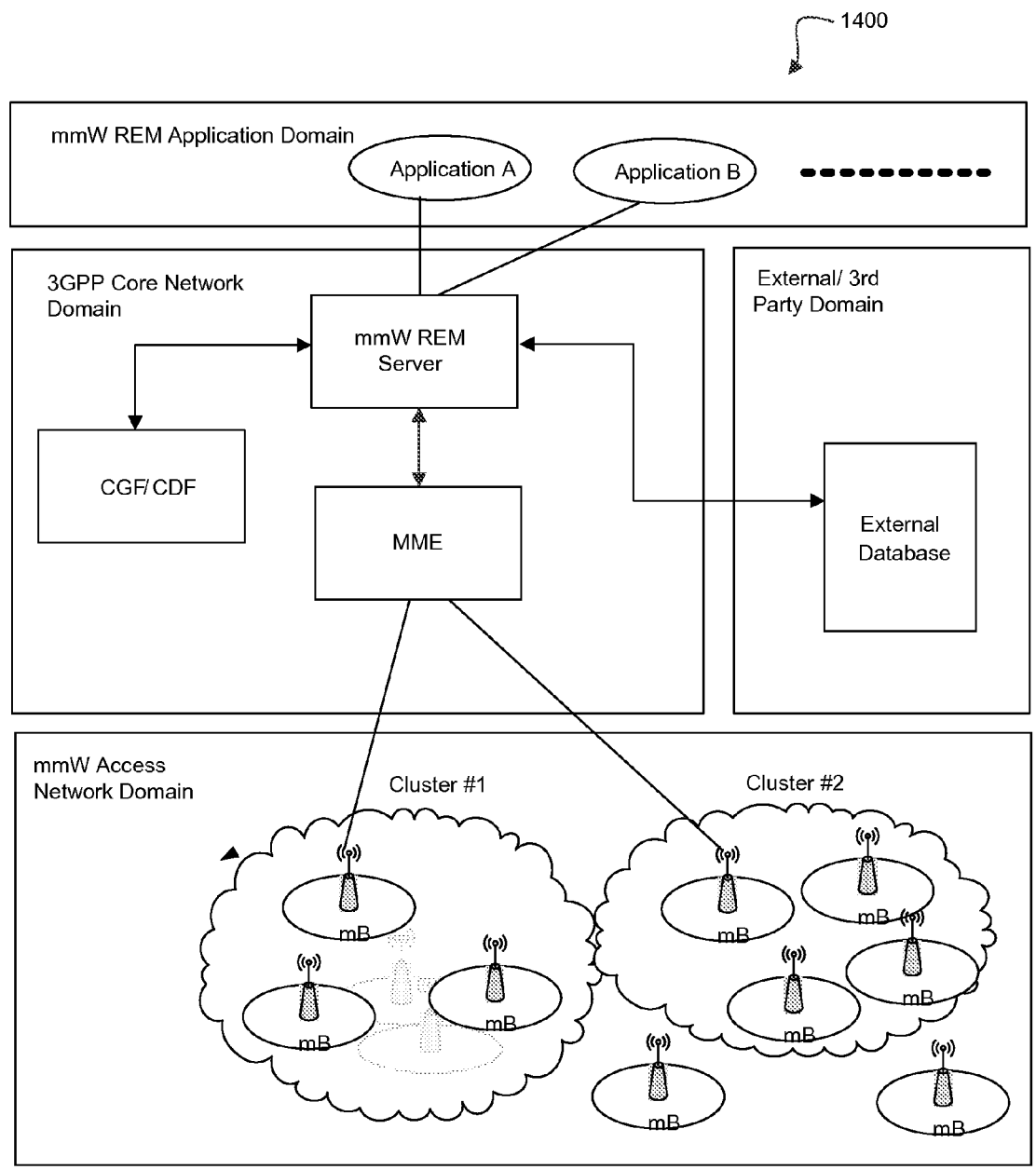
FIG. 14 is a diagram of an exemplary architecture employing radio environment measurement (REM) in mmW.

FIG. 14 is a diagram of exemplary architecture 1400 employing radio environment measurement (REM) in mmW.

Figure 15:
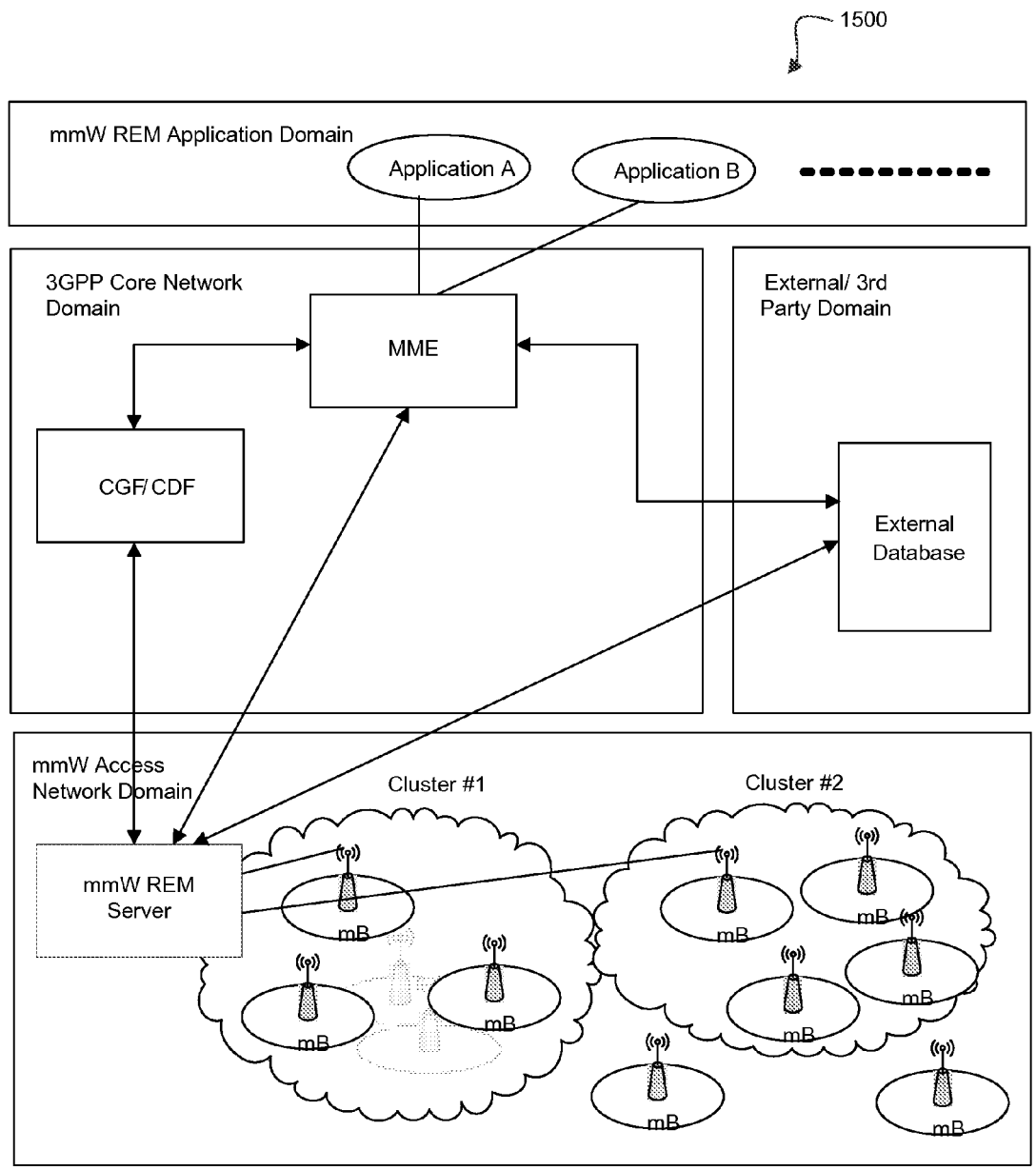
FIG. 15 is a diagram of an exemplary architecture employing radio environment measurement (REM) in mmW.

FIG. 15 is a diagram of exemplary architecture 1500 employing radio environment measurement (REM) in mmW.

The 3GPP core network domain may include a mmW REM server. This server may be responsible for collating all mmW REM information from the access network and post-processing this information to make the data available for mmW REM applications. The mmW REM server may interface with charging gateway function (CGF) or charging data function (CDF) to enable required billing/charging for mmW REM data. The mmW REM server may pull required information from 3rd party database providers in order to enhance the mmW REM data, for example with existing terrain data. The mmW REM server may reside outside the 3GPP core network and may communicate with 3GPP core network nodes via an interworking function. The placement of the mmW REM server may be at the core network domain (FIG. 14) or within the mmW Access network domain (FIG. 15).

The mmW REM server may communicate with MME to obtain mmW REM information from the mmW access network domain. The mmW access network domain may be responsible for performing measurements pertaining to mmW REM and for forwarding this information to the mmW REM server to make this available by means of a consistent application programming interface (API) to the mmW REM applications. The mmW infrastructure nodes may collect mmW REM measurement info and send this to a mmW REM server for post-process of this data. This is a centralized approach, where mmW REM data from all mBs may be collected at the mmW REM server, which post-processes this information with historic information and/or information from 3rd party external databases. If the data is post-processed, the mmW REM server may update the 3rd party databases as per the accepted configuration between the mmW REM server and external database servers. This may depend on the type of information stored in the database and the agreements between the mobile operator who owns the mmW REM server and the external database providers.

The type of information collected may be terrain information which may change infrequently. In such scenario, when there is a change in this information, the 3rd party server may be configured to update the mmW REM server by means of "push" mechanism. If allowed per the configuration, when the mmW REM server detects change in terrain information it may be configured to update the 3rd party server maintaining terrain information by means of "push" mechanism. Either the mmW REM server or the 3rd party server may be configured to perform a "pull" either periodically or triggered by some internal events.

A clustering approach may be employed. The mmW REM data may be post-processed locally within the mmW access network domain to reduce the overhead on the backhaul and to enable distributed processing of this data within the network. To facilitate distributed processing, localized groups or clusters may be formed to collect and perform either all or a subset of post-processing of mmW REM data.

A group of mBs which may be in relatively close geographic proximity or radio (RF) proximity may be grouped into localized clusters. This selection of mBs to be part of a group may be coordinated by a central server or may be done locally by exchange of CLUSTER-JOIN request/response messages. Each mB may be aware of its neighboring mBs (e.g., 3GPP SON mechanism defined in Release 10). An mB deciding to start a cluster for mmW REM information which is not already part of a cluster and has not itself received any request for joining a cluster may trigger a cluster. Probe request/response may be used by any new node that joins the network to determine if there are any existing clusters and if it may become part of an existing cluster. The mBs within a cluster agree upon a cluster head which would be responsible for post-processing of the collected mmW REM data within that cluster. This cluster head may forward the processed REM data to the MME to reach the mmW REM server. It may periodically update the other nodes within the cluster with the post-processed information as necessary.

Each mB may be part of more than one cluster. Overlapping clusters may be a possibility in this approach. As each mB performs its REM measurements, it may request its neighboring mBs collect and provide this info based on either scheduled sounding or opportunistic sounding. The collected information may be post-processed at the mB that made the transmission. In the scheduled sounding approach, the transmitter may be known based on the schedule from the centralized node. In the opportunistic approach, this is identified based on the piggybacked information for the purpose of REM measurement. This may be combined with any historic information as required to enable better post-processing.

For the collection and post-processing of the mmW REM data, network coding is compatible with this framework. The nodes within a cluster or localized groups may already have a portion of the collected REM data at a particular measuring point or mB. The measuring point may only need to send additional information that is not already available at other nodes within the cluster. This may be achieved by combined understanding of the existing or historic terrain and REM info, geographic location of the nodes, characteristics of the transmission being measured such as time stamp, location of Tx, power, direction of transmission, information about the Tx antenna pattern etc, and based on the AoD, AoA, power, and propagation time from the obtained measurements. Utilizing this information, the measuring point may share, e.g., may only share, relevant data with a subset of its neighbors it deems necessary based on the information.

Each node may utilize the collected information to create a detailed view of mmW REM data for its own local use and for optimizing the network performance, for example for better interference management, opportunities for spatial reuse based on identified location of mobile users being serviced by its neighboring mBs, optimized scheduling of its mobile users, transmit power levels, opportunities for handover for its current users etc.

Dynamic clustering may be provided. For example, the mB may wish to create an REM based on the periodic measurement campaign and/or a triggering mechanism which may be initiated by WTRU, network, etc. In order to minimize the overhead in the network, e.g., backhaul and fronthaul systems, only a cluster of the mBs may participate in the REM measurement campaign. The member mBs in a cluster may be identified by the network and/or may be the one that initiates the measurement campaign. The member mBs and size of a cluster may be determined by the historical information available at the network, location of the mBs, the resolution of the REM requested, WTRU mobility pattern, etc.

Procedures for dynamic clustering performed by an mB include that the mB identifies an REM measurement requirement. This may be due to an event-triggered situation, e.g., a WTRU attached to the mB requests relevant information (e.g., topology information), or mB wishes to identify the REM to configure or improve mmW link connection to the WTRU. A link break or degradation (e.g., feedback from WTRU to mB via control signals such as RSSI, CQI, etc.) may trigger this procedure.

The REM information requested by WTRU or network may be in various forms and result in different granularities and sizes of the measurement data, e.g., static blocking object identification between the mB and WTRU, mobility pattern recognition, mmW channel gain/received signal power at a grid point, etc. Different measurement configuration at the mBs and WTRUs along with the historical information available to the network such as topology maps in the database (e.g., google maps), average mobility pattern, average channel quality and best mean Tx-Rx beam orientation may be required.

Based on the REM information requested and available historical data at the mB, the mB may initiate a measurement campaign where it determines the parameters such as measurement transmission time slots (measurement schedule), beam orientation, beam width, transmit power, etc. The transmitting mB may send its measurement transmission request to the other mBs within an initial cluster, denoted as Cluster 1, via corresponding control messages. Cluster 1 may be determined based on static information such as mB locations, antenna capabilities, etc as well as historical information such as averaged traffic load, etc. The transmission of the measurement schedule and Tx-Rx configuration information may be transmitted in separate control message and/or appended into the broadcast messages as discussed herein.

In a scheduled measurement, the transmitting mB and others may negotiate and identify a measurement schedule based on the existing data load and schedules at the mBs. After confirmation of the measurement schedules by the mBs that participate in the measurement campaign, the transmitting mB finalizes the measurement schedule and performs the operation accordingly. In an opportunistic measurement campaign, the transmitting mB may or may not send the measurement transmit schedules to other mBs, may send averaged slot information to reduce the overhead, e.g., measurement probe signal to be transmitted within 1 sec, or may transmit measurement probe signals that may be appended to the data packets.

The transmitting mB may start the measurement campaign by configuring its transmission parameters initially (transmit power, beam orientation and beam width, etc.) that is based on the REM information needed along with the historical data. The mB may create a preferred configuration list pertaining to the measurement cluster, Cluster 1, which also includes; the mBs preferred in the measurement campaign as transmitters and/or receivers, their Tx-Rx antenna beamwidths, Tx power, etc. The preferred cluster configuration list may be updated based on the measurement results collected.

The preferred configuration list is conveyed to the mBs in the cluster via corresponding management signals and/or broadcast messages. The mBs in Cluster 1, with the preferred cluster list available, participate in the measurement campaign. The mBs, depending on their transmission schedules, may adapt their configurations to the ones transmitted in the preferred cluster list. The mBs that cannot adapt may send a NACK feedback to the measuring mB.

After the measurement is carried out within Cluster 1 based on the preferred measurement configuration parameters, the receiving mBs convey the measurement results to the measuring mB. To reduce the overhead between these mBs, the cluster mBs and employ post-processing to the measured data to reduce the overhead. The post-processing may be in the category of compression where the node sends compressed measurement data. The mB may try to process the data further to obtain REM related information, e.g., a truck identified, and send this refined information.

The measuring mB, upon receiving the initial measurement results from Cluster 1, collates and jointly processes the measurement data to obtain the required REM information. Depending on the results obtained, the measuring mB may request and perform another measurement campaign by updating the cluster and preferred configuration list. Upon processing the received measurement data, the measuring mB may identify a new cluster with updated mBs assigned to it, e.g., Cluster 2. The new cluster may be based on the mBs that have and have not provided sufficient information for the requested REM measurement campaign. In order to refine the measurement result, the measuring mB may determine a new set of measurement configuration list to include Tx-Rx configurations in the cluster. For example, the measuring mB may request an mB pair at the cluster to use specific Tx-Rx beams (e.g., with known beam orientation, beam width, Tx power).

Based on the received measurement data available, the measuring mB may identify the correlation between the measurement sets in Cluster 1, e.g., mB2-mB3 measurement and mB4-mB5 measurement may be identified as highly correlated. To reduce the overhead and transmission power in the next measurement campaign, the measuring mB may define a specific measurement configuration to mB2, mB3, mB4, and mB5 taking the correlation information into account. For example, the measuring mB may ask mB2-mB3 to use larger beamwidth to identify particular features of an object in the topography, e.g., object boundaries only, and smaller beamwidths for mB4-mB5 to determine others such as material used in the same object, etc. The measuring mB may propose particular preamble codes to these mB pairs (mB2-mB3 and mB4-mB5) to further utilize the correlation among the corresponding measurement signals. This may be in terms of jointly designed preambles with specific repetition patterns and spreading factors.

System design approaches utilizing radio maps and other measurement info may be provided. MAC and RRM layers make use of the radio map data to make multiple decisions, often preemptively, in order to improve individual user experience and reduce overhead signaling.

In a preemptive HO, a preemptive HO manager may configure neighboring eNB directional antennas to provide seamless handoff of high bandwidth/high frequency connectivity. Each WTRU connection may be associated with REM state matrix.

The REM state matrix includes at least one of the current grid location of user, past grid locations of user, with depth, d, and/or a list of possible future routes, where a route is a list of possible future grid locations with depth, f. Associated information with current and past grid location includes at least one of Cell ID, RSRP/RSRQ, and/or eNB Antenna State Information. Associated information with each element of the list of possible future routes includes at least one of Cell IDs accessible by past users, RSRP/RSRQ typical for each cell ID, and/or eNB Antenna State Information typical for each cell ID.

WTRU measurements may report to the preemptive HO manager the WTRU position such that the State Matrix may be updated as the user moves or signal strength changes. The measurement reports may be periodic or may be event triggered. WTRU location may trigger the REM measurement reports, such that when the WTRU position moves out of the current grid location, a measurement may be reported.

After the state matrix is updated, the preemptive HO manager may evaluate the list of possible future routes to assess the need for a pre-emptive HO event. These pre-emptive events may trigger other eNBs to reserve resources and direct a signal (e.g., through a steered beam) to the grid location of the user. These events may be triggered when the current RSRP/RSRQ is below a threshold. The events may be triggered when the RSRP/RSPQ is expected to drop below a threshold in one or more of the possible future grid locations, based on past WTRU measurements at those future grid locations.

When a pre-emptive HO event is triggered for a particular eNB, the eNB transmits a beam specific reference symbol (BSRS) to initiate the discovery and BF procedures with this directional cell (mB). The eNB Antenna State Information between the event triggered cNB and the WTRU predictive future grid point may be used to configure the cNB antenna beamsteering configuration.

WTRU-specific preemptive scheduling using directional antenna information stored in REM may be provided. Users often follow daily routine and travel through the same paths on a daily basis. In this use case, WTRU specific information pertaining to a specific user's (e.g., identified by IMSI) previous routes may be used to make predictive network decisions. The WTRU specific information may be cached at the eNB or stored on the WTRU. When this information is stored at the WTRU, predictive algorithms may be executed at the WTRU and the WTRU REM state matrix may be updated by the WTRU and shared with the eNB. When the WTRU information is cached at the eNB, the predictive algorithms may be executed at the eNB and state matrix may be generated at the eNB.

It may be beneficial for the REM map data to be cached in the WTRU where local decisions may be made about the optimal communications links at the current time or along the predicted route. The master copy of the REM databased with large scale statistical data may be stored in eNB (e.g., macro, micro, femto, or small cell) memory and may be queried and/or downloaded all together by the WTRU.

Admission control/mB selection may be provided. When a WTRU wishes to join the network, the usual admission control concerns may be expanded. For example, trajectory may play a role in which (if any) mmW BS admits the WTRU. If the WTRU's location information is available at the network which may be sent via the LTE network, the network may send short-listed receive beams that the WTRU may try first for discovery and/or beam-forming. This may greatly reduce the search space and improve discovery time. The network may provide the WTRU with one or more mBs to associate with which may be part of the same mmW cluster (e.g., the mmW base stations where mobility is managed locally).

The REM obtained by the measurement campaigns discussed herein may be utilized for admitting a WTRU to the mmW network. If an REM is already available in the network, the MME, in addition to the WTRU information such as location, trajectory etc. may utilize the REM information to enhance the admission control. The MME may identify the optimal Tx-Rx beam directions between the mBs and the WTRU at a given time (e.g., derived from the WTRU trajectory along with mmW RSSI measurement results contained in the REM measurements). For example, depending on the location of the WTRU and the potentially blocking objects between particular mBs and the WTRU, the MME may inform such blocked mBs not to transmit reference signals in order to save transmit power. Similarly, the MME may inform other mBs regarding the optimal beam orientation and beam width/shape to transmit the reference signals.

The admission control and REM measurement campaign may be carried out in an interactive manner. In a dual-band system, a WTRU that wishes to be attached to the mmW network may send an LTE beacon signal regarding its admission request. Depending on the location and REM information at hand, the beacon receiving mB and/or MME may initiate an REM measurement campaign which is tailored for the WTRUs admission request. This may include mmW RSSI at the grid points surrounding the WTRU and/or within its trajectory, optimal Tx-Rx beam orientations and widths, Tx powers, etc. Depending on the negotiation phase between the mB and WTRU in the admission procedure, the MME and/or mB may trigger further REM measurement campaigns which may be input to the current or preemptive admission procedures.

Load balancing and node deployment aid may be provided. Historical and regional growth in capacity demand, combined with static and statistical maps may indicate where and when to deploy new mmW BS. Databases may include zoning information, building ownership information, estimated site cost information, to further aid in new site selection).

The invention claimed is:

1. A wireless transmit/receive unit (WTRU) comprising:
a transmitter/receiver; and
a processor configured to:
  when the WTRU is in an idle state:
    receive a common control channel from a millimeter wave base station (mB);
    decode a measurement schedule included in the common control channel, wherein the measurement schedule included in the common control channel includes one or more slots during which sounding signals will be sent; and
    determine a first slot during which the WTRU is available to measure a sounding signal; and
  when the WTRU is in a connected state:
    receive a dedicated channel from the millimeter wave base station;
    decode a measurement schedule and a receiver configuration included in the dedicated channel, wherein the measurement schedule and the receiver configuration included in the dedicated channel are specific to the WTRU, and wherein the measurement schedule included in the dedicated channel includes one or more slots during which sounding signals will be sent; and
    determine, based on the measurement schedule included in the dedicated channel, a second slot during which the WTRU is available to measure a sounding signal.

2. The WTRU of claim 1, wherein the receiver configuration includes information associated with a receive beam orientation and a beam width, and wherein the processor is further configured to:
  determine the receive beam orientation and the beam width based on the information; and
  perform a measurement of the sounding signal during the second slot using the receive beam orientation and the beam width; and
  send the measurement to the mB.

3. The WTRU of claim 1, wherein, when the WTRU is in the connected state, the processor is further configured to:
  receive the common control channel from the millimeter wave base station (mB); and
  decode the measurement schedule included in the common control channel; and
  determine, based on the measurement schedule included in the common control channel, the first slot during which the WTRU is available to measure a sounding signal.

4. The WTRU of claim 1, wherein the WTRU is available to measure a sounding signal when the WTRU does not have uplink or downlink activity scheduled.

5. The WTRU of claim 1, wherein the processor is further configured to send a triggering message to the mB, and wherein the triggering message is associated with an opportunistic measurement campaign, and wherein the measurement schedule and receiver configuration associated with the dedicated channel are received in response to the triggering message.

6. The WTRU of claim 1, wherein the processor is further configured to:
  perform a measurement of at least one of: the sounding signal associated with the connected state, or the sounding signal associated with the idle state; and
  send the measurement to the mB.

7. The WTRU of claim 1, wherein the processor is further configured to send an acknowledgement to the mB that the WTRU intends to measure at least one of: the sounding signal associated with the connected state, or the sounding signal associated with the idle state.

8. The WTRU of claim 1, wherein the idle state comprises the WTRU not being connected to the mB for WTRU specific uplink and downlink communications.

9. A method implemented in a wireless transmit/receive unit (WTRU), the method comprising:
  when the WTRU is in an idle state:
    receiving a common control channel from a millimeter wave base station (mB);
    decoding a measurement schedule included in the common control channel, wherein the measurement schedule included in the common control channel includes one or more slots during which sounding signals will be sent; and
    determining a first slot during which the WTRU is available to measure a sounding signal; and
  when the WTRU is in a connected state:
    receiving a dedicated channel from the millimeter wave base station;
    decoding a measurement schedule and a receiver configuration included in the dedicated channel, wherein the measurement schedule and the receiver configuration included in the dedicated channel are specific to the WTRU, and wherein the measurement schedule included in the dedicated channel includes one or more slots during which sounding signals will be sent; and
    determining, based on the measurement schedule included in the dedicated channel, a second slot during which the WTRU is available to measure a sounding signal.

10. The method of claim 9, wherein the receiver configuration includes information associated with a receive beam orientation and a beam width, and wherein the method further comprises:
  determining the receive beam orientation and the beam width based on the information; and
  performing a measurement of the sounding signal during the second slot using the receive beam orientation and the beam width; and
  sending the measurement to the mB.

11. The method of claim 9, wherein, when the WTRU is in the connected state, the method further comprises:
  receiving the common control channel from the millimeter wave base station (mB); and
  decoding the measurement schedule included in the common control channel; and determining, based on the measurement schedule included in the common control channel, the first slot during which the WTRU is available to measure a sounding signal.

12. The method of claim 9, wherein the WTRU is available to measure a sounding signal when the WTRU does not have uplink or downlink activity scheduled.

13. The method of claim 9, wherein the method further comprises sending a triggering message to the mB, and wherein the triggering message is associated with an opportunistic measurement campaign, and wherein the measurement schedule and receiver configuration associated with the dedicated channel are received in response to the triggering message.

14. The method of claim 9, wherein the method further comprises:
 performing a measurement of at least one of: the sounding signal associated with the connected state, or the sounding signal associated with the idle state; and
 sending the measurement to the mB.

15. The method of claim 9, wherein the method further comprises sending an acknowledgement to the mB that the WTRU intends to measure at least one of: the sounding signal associated with the connected state, or the sounding signal associated with the idle state.

16. The method of claim 9, wherein the idle state comprises the WTRU not being connected to the mB for WTRU specific uplink and downlink communications.

* * * * *